US008676379B2

(12) United States Patent
Okazaki

(10) Patent No.: US 8,676,379 B2
(45) Date of Patent: Mar. 18, 2014

(54) DEVICE AND METHOD FOR CONTROLLING ROBOT ARM, ROBOT, AND ROBOT ARM CONTROL PROGRAM

(75) Inventor: Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 1407 days.

(21) Appl. No.: 12/096,106

(22) PCT Filed: Jun. 28, 2007

(86) PCT No.: PCT/JP2007/062984
§ 371 (c)(1),
(2), (4) Date: Jun. 4, 2008

(87) PCT Pub. No.: WO2008/004487
PCT Pub. Date: Jan. 10, 2008

(65) Prior Publication Data
US 2009/0171505 A1      Jul. 2, 2009

(30) Foreign Application Priority Data
Jul. 4, 2006  (JP) .................................. 2006-184172

(51) Int. Cl.
*G05B 9/00*         (2006.01)
(52) U.S. Cl.
USPC ........... 700/255; 700/258; 700/259; 700/260; 901/9; 901/15; 901/28; 901/46; 901/47; 901/49
(58) Field of Classification Search
USPC ...................................... 700/255, 258; 901/2
See application file for complete search history.

(56) References Cited

U.S. PATENT DOCUMENTS

| 5,150,026 A * | 9/1992 | Seraji et al. ............... 318/568.11 |
| 5,737,500 A * | 4/1998 | Seraji et al. ................... 700/251 |
| 7,783,386 B2 * | 8/2010 | Merte et al. ................... 700/255 |
| 2004/0140787 A1 | 7/2004 | Okamoto et al. |
| 2006/0049939 A1* | 3/2006 | Haberer et al. ............... 340/541 |

FOREIGN PATENT DOCUMENTS

| GB | 2 196 763 | 5/1988 |
| JP | 63-158620 | 7/1988 |
| JP | 10-329071 | 12/1998 |
| JP | 2000-162062 | 6/2000 |
| JP | 2002-187090 | 7/2002 |
| JP | 2004-130460 | 4/2004 |
| JP | 2004-167674 | 6/2004 |
| JP | 2004-223663 | 8/2004 |
| JP | 2004-237403 | 8/2004 |
| JP | 2005-059161 | 3/2005 |

OTHER PUBLICATIONS

International Preliminary Report on Patentability (in the English language), form PCT/IB/373, issued Jan. 20, 2009 in connection with PCT/JP2007/062984 corresponding to the present U.S. application along with Written Opinion of the International Searching Authority, form PCT/ISA/237.
International Search Report issued Sep. 25, 2007 in the International (PCT) Application.

* cited by examiner

*Primary Examiner* — Behrang Badii
*Assistant Examiner* — Jerrah Edwards
(74) *Attorney, Agent, or Firm* — Wenderoth, Lind & Ponack, L.L.P.

(57) ABSTRACT

A control device (1) for a robot arm (8) which, if a person approach detection unit (3) detects approach of a person, performs control according to an impact between the robot arm (8) and the person. The control performed according to the impact is performed through an impact countermeasure motion control unit (4) and by setting individual mechanical impedances for respective joint portions of the robot arm (8) based on a movement of the person detected by a human movement detection unit (2).

4 Claims, 17 Drawing Sheets

DEVICE AND METHOD FOR CONTROLLING ROBOT ARM, ROBOT, AND ROBOT ARM CONTROL PROGRAM

TECHNICAL FIELD

The present invention relates to a device and a method for controlling a robot arm which can physically come into contact with a person such as a household robot, to a robot, and to a robot arm control program.

BACKGROUND ART

In recent years, developments of household robots such as pet robots have been increasingly advanced, and it is expected that more practical household robots, such as household-chores supporting robots, will be practically used, in the future. Such household robots are required to be coexistent with persons within homes and, therefore, should inevitably come into contact with persons. Accordingly, such household robots are required to be flexible, in view of safety.

To address the aforementioned issue, Patent Document 1 (Japanese Unexamined Patent Publication No. 10-329071) discloses, as a conventional art, a control device which detects a force applied to a robot arm due to the contact between the robot arm and a person and reduces a restoring force for increasing the safety when a large force is applied to the arm, but increases the restoring force for ensuring higher motion accuracy when a very small force is applied to the arm.

Further, Patent Document 2 discloses a control device including a sensor mechanism 515 for detecting the contact portion of a robot 513 which comes into contact with an environment in which an obstruction exists and for detecting the force of the contact, a position orientation determination device 514 for determining the positions and the orientations of a moving mechanism 511 and a manipulator 512, a calculation machine 517 for calculating contact-force avoiding motions of the robot 513 from the contact force and the positions and orientations, and an actuator 516 for driving the moving mechanism 511 and the manipulator 512 according to the result of the calculation by the calculation machine 517, as illustrated in FIG. 11A. In the event that the robot 513 comes into contact with the environment in which the obstruction exists, both the moving mechanism 511 and the manipulator 512 are operated in conjunction with each other to perform avoiding motions.

Further, Patent Document 3 discloses an impedance control device which detects, with a force detection sensor 412, the force applied to a robot 401 having an end effecter 411 by an external environment, then estimates the stiffness coefficient of the external environment in real time and drives and controls the arm 410 of the robot 401 by controlling a motor 413a, as illustrated in FIG. 12.

Patent Document 1: Japanese Unexamined Patent Publication No. 10-329071
Patent Document 2: Japanese Unexamined Patent Publication No. 2005-59161
Patent Document 3: Japanese Unexamined Patent Publication No. 2004-223663

DISCLOSURE OF INVENTION

Subject to be Solved by the Invention

However, the aforementioned conventional control devices are not structured in consideration of application to a multiple joint robot arm and are not structured as control devices which ensure safety in cases where they are applied to a multiple joint robot arm.

Further, the conventional control devices are not structured in consideration of the movement of a person who comes into contact with the robot arm and are not capable of performing optimum control according to the movement of the person.

Further, Patent Document 2 discloses moving the contact portion 532 of the robot 513 which comes into contact with the environment in which the obstruction exists along a contact avoiding path 526 in the direction of the contact force 531 to perform an avoiding motion 527, which reduces the contact force 531 applied by the environment and finally eliminates the contact, as illustrated in FIGS. 11B and 11C. Further, as illustrated in FIGS. 11D and 11E, the surface of the contact portion 532 of robot 513 which contacts with the environment in which the obstruction exists is inclined in the direction of the moment 533 generated by the contact force 531 and, also, the contact portion is moved in such a way as to draw a circle 526 with an arbitrary size to perform an avoiding motion 527, which reduces the contact force 531 applied by the environment and finally eliminates the contact. However, Patent Document 2 does not disclose any concrete control of the motions for the respective avoiding motions 527.

Further, as illustrated in FIG. 12, Patent Document 3 discloses changing the impedance characteristic of the robot such that it has a correlation with the calculated stiffness coefficient of the external environment and calculating the position of the end effecter 411 using these values. Patent Document 3 focuses only on the position of the end effecter 411 and does not disclose any concrete control of the motions of the arm 410 such that the arm 410 does not damage persons due to contact.

It is an object of the present invention to provide a robot arm control device and control method, a robot and a robot arm control program which overcome the issues of the conventional control devices and are capable of causing even a multiple joint robot arm to contact with a person safely, performing optimum contact motions according to the movement of the person and realizing safe motion control of a robot arm capable of being coexistent with a person without damaging the person due to contact.

Means for Solving the Subject

In order to attain the object, there are provided the following structures, according to the present invention.

According to a first aspect of the present invention, there is provided a control device for a multiple joint robot arm comprising:

an impact position acquisition means for acquiring an impact position at which the multiple joint robot arm comes into contact with a person or a movable object; and an impact countermeasure motion control means for controlling to perform an impact countermeasure motion for making a stiffness of a joint portion of the multiple joint robot arm which is closer to a base portion than a link of the multiple joint robot arm to which the impact position belongs to be lower than a stiffness of other joint portion based on the impact position at which the multiple joint robot arm comes into contact with the person or movable object which is acquired by the impact position acquisition means.

According to a ninth aspect of the present invention, there is provided a method for controlling a multiple joint robot arm comprising:

detecting movement of a person or movable object approaching the robot arm with a movement detection means;

detecting that the person or movable object approaches the robot arm, based on result of detection of the movement of the person or movable object detected by the movement detection means;

detecting that the person or movable object approaches the robot arm, based on the movement of the person or movable object detected by the movement detection means, by an approach detection means; and controlling to perform an impact countermeasure motion according to impact between the person and the robot arm, by when the approach of the person or movable object is detected by the approach detection means, acquiring, by an impact position acquisition means, an impact position through estimation of the impact position at which the joint robot arm comes into contact with the person or movable object based on the movement of the person or movable object detected by the movement detection means, and also by making, by an impact countermeasure motion control means, a stiffness of a joint portion of the joint robot arm which is closer to a base portion than a link of the joint robot arm to which the impact position acquired by the impact position acquisition means belongs to be lower than a stiffness of other joint portion.

According to a 10th aspect of the present invention, there is provided a robot comprising:

the joint robot arm; and the robot arm control device for controlling the robot arm as defined in any one of the first to eighth aspects, wherein the impact countermeasure motion according to the impact between the person or movable object and the robot arm is performed by the impact countermeasure motion control means.

According to an 11th aspect of the present invention, there is provided a robot arm control program for causing a computer to function as: an impact position acquisition means for acquiring an impact position at which a joint robot arm comes into contact with a person or movable object; and an impact countermeasure motion control means for controlling to perform an impact countermeasure motion for making a stiffness of a joint portion of the joint robot arm which is closer to a base portion than a link of the joint robot arm to which the impact position belongs to be lower than a stiffness of other joint portion, based on the impact position at which the joint robot arm comes into contact with the person or movable object which is acquired by the impact position acquisition means.

Effects of the Invention

The robot arm control device and the control method, the robot and the robot arm control program according to the present invention are adapted to include the impact position acquiring means and the impact countermeasure motion control means or to include the functions of these means. Accordingly, if the person approaches the robot arm, it is possible to operate the robot arm at appropriate orientations according to the movement of the person or operate the robot arm with appropriate mechanical impedances for the joint portions. In other words, on the basis of the impact position at which the multiple joint robot arm comes into contact with the person or the movable object, it is possible to make the stiffness of the joint portion of the multiple joint robot arm which is closer to the base portion than the link of the multiple joint robot arm to which the impact position belongs to be smaller than the stiffness of the other joint portion, which causes the joint portion closer to the base portion to be easily moved, thereby releasing the force acting on the robot arm due to the impact through this joint portion and reducing the impact force applied to the person. This can improve the safety. Accordingly, it is possible to realize safe motion control of the robot arm which is capable of causing even the multiple joint robot arm to come into contact with the person safely, performing the optimum contact motion according to the movement of the person, and causing the robot arm to be capable of being coexistent with persons without damaging the persons due to contact.

BRIEF DESCRIPTION OF DRAWINGS

These and other aspects and features of the present invention will become clear from the following description taken in conjunction with the preferred embodiments thereof with reference to the accompanying drawings, in which.

BEST MODE FOR CARRYING OUT THE INVENTION

Figure 1:
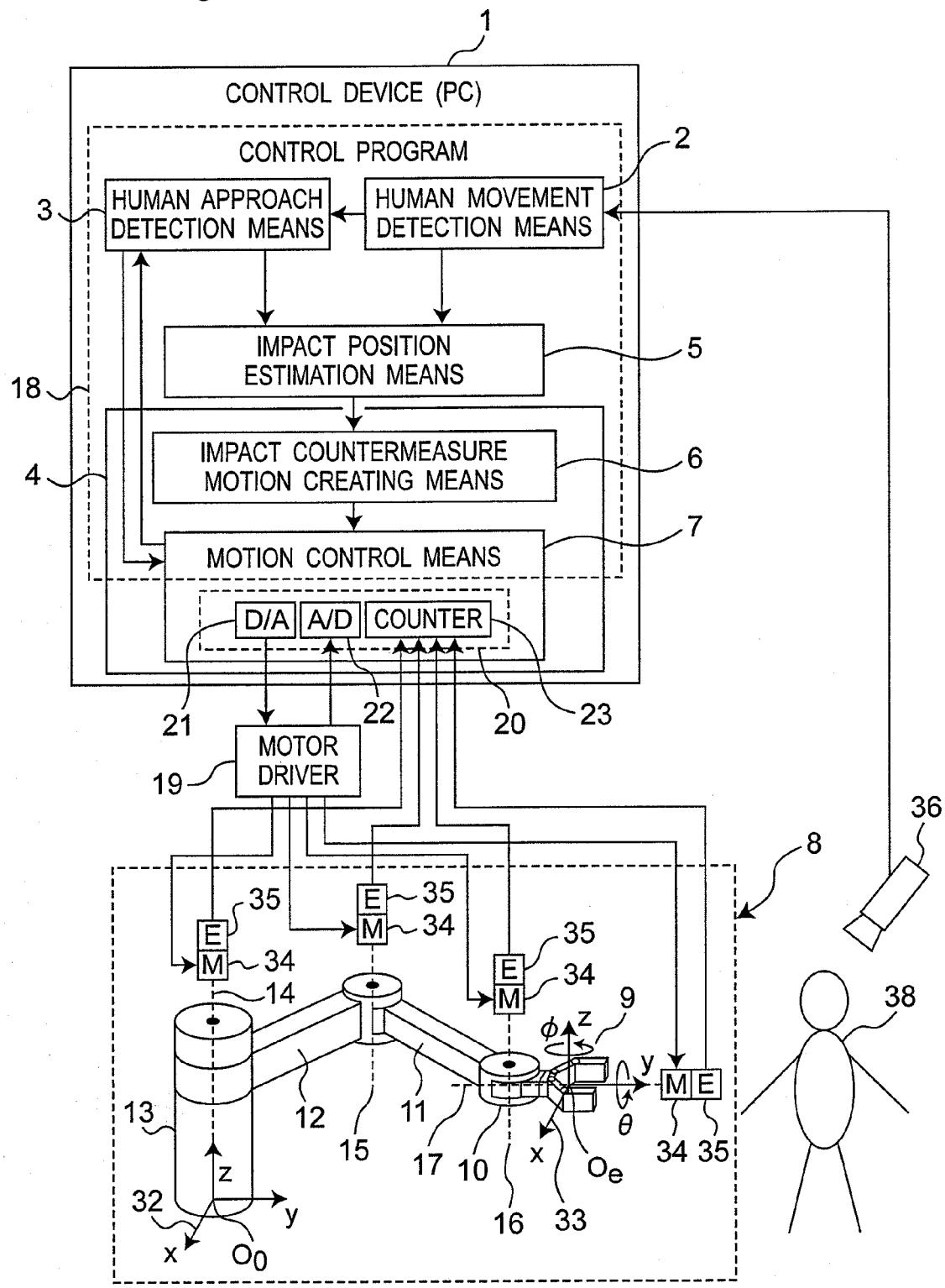
FIG. 1 is an explanation view illustrating the structure of a robot arm control device and the structure of a robot arm to be controlled, according to a first embodiment of the present invention.

Before the description of the present invention proceeds, it is to be noted that like parts are designated by like reference numerals throughout the accompanying drawings.

Hereinafter, embodiments of the present invention will be described in detail, on the basis of the drawings.

Hereinafter, various aspects of the present invention will be described, before the detailed description of the embodiments of the present invention with reference to the drawings.

According to a first aspect of the present invention, there is provided a control device for a multiple joint robot arm comprising:

an impact position acquisition means for acquiring an impact position at which the multiple joint robot arm comes into contact with a person or a movable object; and an impact countermeasure motion control means for controlling to perform an impact countermeasure motion for making a stiffness of a joint portion of the multiple joint robot arm which is closer to a base portion than a link of the multiple joint robot arm to which the impact position belongs to be lower than a stiffness of other joint portion based on the impact position at which the multiple joint robot arm comes into contact with the person or movable object which is acquired by the impact position acquisition means.

According to a second aspect of the present invention, there is provided the robot arm control device as defined in the first aspect, wherein the impact countermeasure motion control means controls to perform the impact countermeasure motion for making the stiffness of the joint portion, at a side closest to the base portion, of the link of the multiple joint robot arm to which the impact position belongs, to be lower than the stiffness of the other joint portions.

According to a third aspect of the present invention, there is provided the robot arm control device as defined in the first or second aspect, wherein the impact countermeasure motion control means controls to perform the impact countermeasure motions, by maintaining a stiffness of the joint portion closer to a wrist portion than the link of the multiple joint robot arm to which the impact position belongs or by providing additional stiffness to the above joint portion.

According to a fourth aspect of the present invention, there is provided the robot arm control device as defined in the first or second aspect, wherein the impact countermeasure motion control means controls to perform the impact countermeasure motion, by controlling individual joint angles of respective joint portions of the multiple joint robot arm which are closer to a wrist portion than the link of the multiple joint robot arm to which the impact position belongs.

According to a fifth aspect of the present invention, there is provided the robot arm control device as defined in the first or second aspect, further comprising a movement detection means for detecting movement of the person or movable object, wherein the impact position acquisition means acquires the impact position by estimating the impact position at which the multiple joint robot arm comes into contact with the person or movable object based on result of detection by the movement detection means, and the impact countermeasure motion control means controls to perform the impact countermeasure motion based on the impact position estimated by the impact position acquisition means.

According to a sixth aspect of the present invention, there is provided the robot arm control device as defined in the fifth aspect, further comprising an approach detection means for detecting the person or movable object approaching the robot arm based on the result of detection by the movement detection means, wherein the impact countermeasure motion control means controls to perform the impact countermeasure motion, when the approach detection means detects approach of the person or movable object.

According to a seventh aspect of the present invention, there is provided the robot arm control device as defined in the fifth or sixth aspect, wherein the impact countermeasure motion control means controls to perform the impact countermeasure motion, based on a velocity component of a movement of the person or movable object detected by the movement detection means.

According to an eighth aspect of the present invention, there is provided the robot arm control device as defined in any one of the fifth to seventh aspects, wherein the movement detection means detects a movement of the person by detecting a position and a movement velocity of the person or movable object.

According to a ninth aspect of the present invention, there is provided a method for controlling a multiple joint robot arm comprising:

detecting movement of a person or movable object approaching the robot arm with a movement detection means;

detecting that the person or movable object approaches the robot arm, based on result of detection of the movement of the person or movable object detected by the movement detection means;

detecting that the person or movable object approaches the robot arm, based on the movement of the person or movable object detected by the movement detection means, by an approach detection means; and controlling to perform an impact countermeasure motion according to impact between the person and the robot arm, by when the approach of the person or movable object is detected by the approach detection means, acquiring, by an impact position acquisition means, an impact position through estimation of the impact position at which the joint robot arm comes into contact with the person or movable object based on the movement of the person or movable object detected by the movement detection means, and also by making, by an impact countermeasure motion control means, a stiffness of a joint portion of the joint robot arm which is closer to a base portion than a link of the joint robot arm to which the impact position acquired by the impact position acquisition means belongs to be lower than a stiffness of other joint portion.

According to a 10th aspect of the present invention, there is provided a robot comprising:

the joint robot arm; and the robot arm control device for controlling the robot arm as defined in any one of the first to eighth aspects, wherein the impact countermeasure motion according to the impact between the person or movable object and the robot arm is performed by the impact countermeasure motion control means.

According to an 11th aspect of the present invention, there is provided a robot arm control program for causing a computer to function as: an impact position acquisition means for acquiring an impact position at which a joint robot arm comes into contact with a person or movable object; and an impact countermeasure motion control means for controlling to perform an impact countermeasure motion for making a stiffness of a joint portion of the joint robot arm which is closer to a base portion than a link of the joint robot arm to which the impact position belongs to be lower than a stiffness of other joint portion, based on the impact position at which the joint robot arm comes into contact with the person or movable object which is acquired by the impact position acquisition means.

Hereinafter, embodiments of the present invention will be described in more detail, on the basis of the drawings.

First Embodiment

FIG. 1 is a view illustrating the structure of a control device 1 for a multiple joint robot arm and the structure of the multiple joint robot arm 8 to be controlled, according to a first embodiment of the present invention. This robot arm control device 1 implements a robot arm control method according to the first embodiment. The robot arm control device 1 can be used with a robot including the multiple joint robot arm 8 and also can be used as programs for controlling the multiple joint robot arm 8, as will be described later.

In FIG. 1, 2 designates a human movement detection means as an example of a movement detection means. The human movement detection means 2 performs image recognition processing using image data image-picked up through an image pickup device 36 such as a camera. Further, the human movement detection means 2 detects information about the position of a person 38 approaching the robot arm 8, and the velocity and direction of the movement of the person 38.

3 designates a human approach detection means, as an example of an approach detection means, which detects that the person 38 approaches the robot arm 8, from the relationship between the information about the position of the person that is detected by the human movement detection means 2 and information about the orientation of the robot arm 8 determined from joint angle information about the robot arm 8 obtained from a motion control means 7 which will be described later.

5 designates an impact position estimation means, as an example of an impact position acquisition means, which estimates the position at which the robot arm 8 and the person 38 are expected to impinge against each other (a position which can be treated as an impact position), from the information about the position of the approaching person 38 and the information about the velocity and the information about direction of the movement of the person 38, namely about the movement velocity vector, which are detected by the human movement detection means 2. Then, the impact position estimation means 5 outputs the result of the estimation to an impact countermeasure motion creating means 6 which will be described later.

4 designates an impact countermeasure motion control means which performs control of the motions of the robot arm 8 during tasks using the robot arm 8 (more specifically, control of the values of mechanical impedances of the robot arm 8). If the human approach detection means 3 detects that a person 38 approaches the robot arm 8, the impact countermeasure motion control means 4 controls impact countermeasure motions at the time of the impact of the person 38 against the robot arm 8, on the basis of the result of the detection by the human movement detection means 2.

The impact countermeasure motion control means 4 is constituted by the impact countermeasure motion creating means 6 and the motion control means 7.

The impact countermeasure motion creating means 6 calculates a joint desired trajectory for the robot arm 8 and joint desired mechanical impedance values at the time when the robot arm 8 and the person 38 will impinge against each other at the expected impact position estimated by the impact position estimation means 5, and then outputs the result of the calculation to the motion control means 7.

The motion control means 7 controls the position and the orientation of the hand of the robot arm 8 to realize desired tasks with the hand of the robot arm 8. If a person 38 approaches, the motion control means 7 change over the control in such a way as to track the joint desired trajectory created by the impact countermeasure motion creating means 6 and also performs, concurrently, impedance control for controlling the mechanical impedance values of the respective joint portions of the robot arm 8 in such a way as to realize the joint desired mechanical impedance values created by the impact countermeasure motion creating means 6. In this case, motors 34, which are examples of driving devices for the respective joint portions, are driven under impedance control, through a motor driver 19 connected to a D/A board 21 and an A/D board 22, to perform bending motions of the respective joint portions of the robot arm 8, as will be described later.

The control device 1 is constituted by a common personal computer in terms of hardware, and the human movement detection means 2, the human approach detection means 3, the impact position estimation means 5, the impact countermeasure motion creating means 6, and the motion control means 7, except an input/output IF (input/output interface) 20, are realized through software as control programs 18 which can be executed by the personal computer.

The input/output IF 20 is constituted by the D/A board 21, the A/D board 22, and a counter board 23 which are connected to an extend slot, such as PCI bus, of the personal computer.

The control programs 18 for controlling the motions of the robot arm 8 are executed to cause the control device 1 to function. Further, encoders 35 coupled to the motors 34 for the respective joint portions of the robot arm 8 output joint angle information, then, the joint angle information is introduced to the control device 1 through the counter board 23, and then the control device 1 calculates control command values for rotational motions of the respective joint portions. The respective calculated control command values are supplied to the motor driver 19 through the D/A board 21, and the motors 34 for the respective joint portions of the robot arm 8 are driven according to the respective control command values transmitted from the motor driver 19.

The robot arm 8 is a multi-link manipulator with 4 degrees of freedom and includes a hand 9, a second link 11 having, at its tip end, a wrist portion 10 to which the hand 9 is mounted, a first link 12 to which the second link 11 is rotatably coupled, and a stand portion 13 to which the first link 12 is rotatably coupled and supported. The wrist portion 10 has two rotational axes (a rotational axis in the vertical direction and a rotational axis in a lateral direction) for a third joint portion 16 and a fourth joint portion 17, which enables changing the orientation (the direction) of the hand 9 relative to the second link 11. The other end of the second link 11 is made rotatable about the vertical rotational axis of the second joint portion 15 relative to the tip end of the first link 12, and the other end of the first link 12 is made rotatable about the vertical rotational axis of the first joint portion 14 relative to the stand portion 13, which enables rotations about a total of 4 axes, thereby forming the multi-link manipulator with 4 degrees of freedom.

Each of the joint portions constituting the rotational portions about the respective axes is provided with a motor 34, as an example of a rotation driving device, which is provided on one of the two members coupled to each other through the corresponding joint portion and also is driven and controlled by the motor driver 19 which will be described later (in actual, the motor 34 is provided inside of the corresponding joint portion of the robot arm 8). Further, each of the joint portions is provided with an encoder 35 for detecting the rotational phase angle of the rotational shaft of the motor 34 (namely, the joint angle) (actually, the encoder 35 is provided inside of the corresponding joint portion of the robot arm 8). The rotational shaft of the motor 34 is coupled to the other member out of the two members coupled to each other through the corresponding joint portion, so that the other member can be rotated about the corresponding shaft with respect to the one member by rotating the rotational shaft in a normal direction and in the opposite direction.

32 designates an absolute coordinate system having a fixed relative positional relationship with a lower fixed portion of the stand portion 13, and its origin point is set to $O_0$. 33 designates a hand coordinate system having a fixed relative positional relationship with the hand 9. The position Oe (x, y) of the origin point of the hand coordinate system 33 viewed from the absolute coordinate system 32 is defined as the position of the hand of the robot arm 8, and the orientation ($\phi$, $\theta$) of the hand coordinate system 33 viewed from the absolute coordinate system 32 is defined as the orientation of the hand of the robot arm 8. The hand position/orientation vector r is defined as $r=[x, y, \phi, \theta]^T$. In the cases of controlling the position and the orientation of the hand of the robot arm 8, the control device 1 performs control such that the hand position/orientation vector r follows a desired hand position/orientation vector $r_{wd}$.

Next, there will be described, the detailed structures and motions of the respective functional blocks constituting the control device 1.

Image data picked up through the image pickup device 36 is inputted to the human movement detection means 2. The human movement detection means 2 performs image recognition processing to detect the two-dimensional position $X_p$ ($x_p$, $y_p$) of the person 38 and the movement velocity vector $V_p$ ($v_x$, $v_y$) of the person 38 when the floor of the room in which the robot arm 8 is placed is viewed from the ceiling thereof, and the human movement detection means 2 outputs information about the two-dimensional position $X_p$ ($x_p$, $y_p$) and the movement velocity vector $V_p$ ($v_p$, $v_y$) to the human approach detection means 3 and the impact position estimation means 5.

Figure 2:
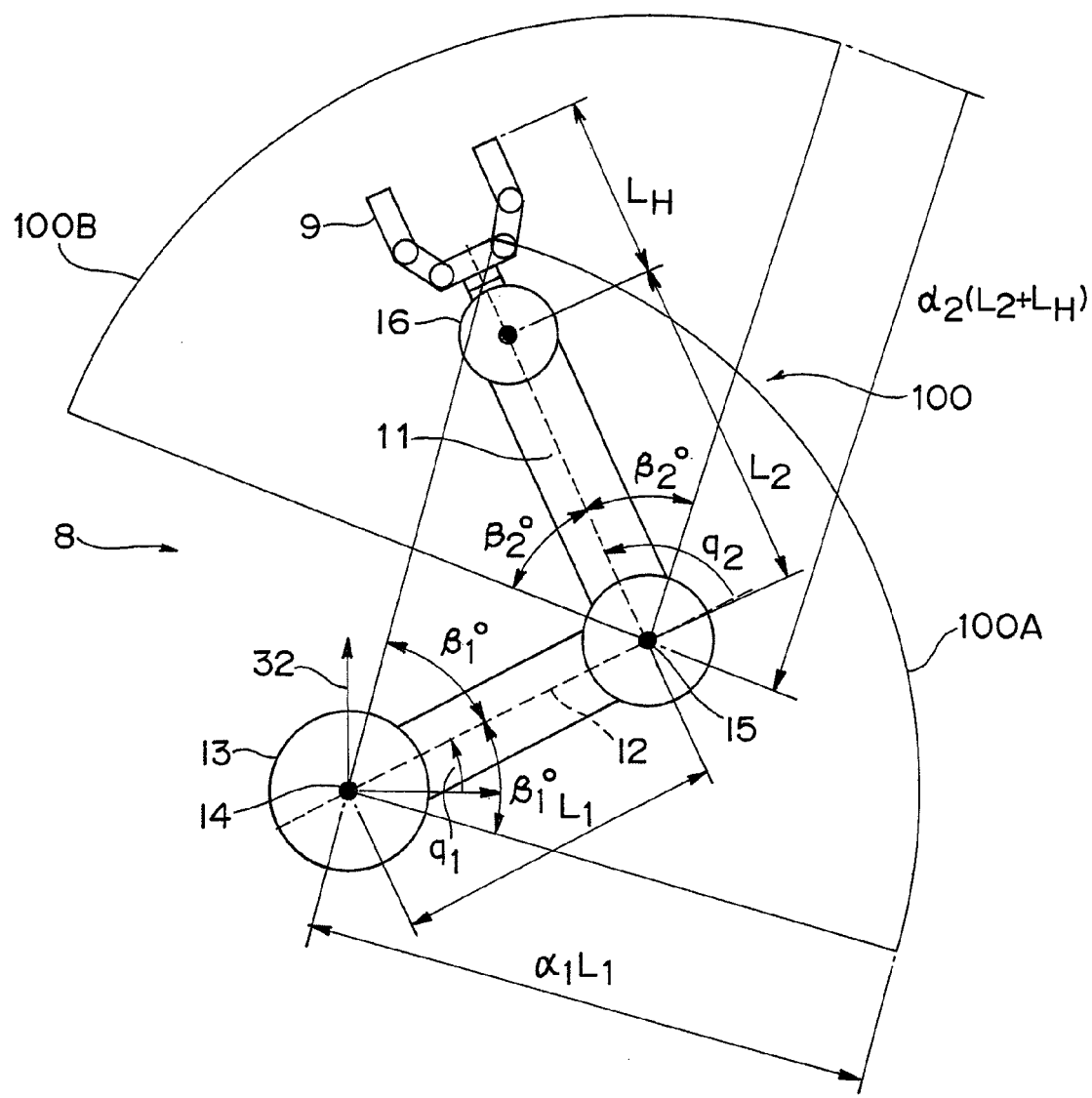
FIG. 2 is a view explaining an impact-warning area of the robot arm which is defined by the robot arm control device according to the first embodiment of the present invention.

The human approach detection means 3 defines an impact-warning area 100 illustrated in FIG. 2 and detects and determines whether or not the person 38 approaches the robot arm 8, on the basis of whether or not the person 38 enters the area 100.

The fan-shaped area 100A on the base end-side, out of the impact-warning area 100, is an area having a radius equal to $\alpha_1$ times the length $L_1$ of the first link 12, namely $\alpha_1 L_1$, and having an angle of, for example, $\pm\beta_1°$ which is centered on the center axis of the first link 12 and is formed by a joint angle $q_1$ of the first joint portion 14, about the first joint axis (the rotational axis of the first joint portion 14). Further, the fan-shaped area 100B on the tip end-side, out of the impact-warning area 100, is an area having a radius equal to $\alpha_2$ times the sum of the length $L_2$ of the second link 11 plus the length $L_H$ of the hand 9, namely $\alpha_2 (L_2+L_H)$, and having an angle of, for example, $\pm\beta_2°$ which is centered on the center axis of the second link 11 and is formed by a joint angle $q_2$ of the second joint portion 15, about the second joint axis (the rotational axis of the second joint portion 15). By setting as described above, it is possible to prevent, certainly, the tip end of the hand 9 from exiting from the fan-shaped area 100B on the tip end-side, even if the range of the fan-shaped area is changed in proportion to the velocity.

The values of $\alpha_1$, $\alpha_2$, $\beta_1$, and $\beta_2$ which define the impact-warning area 100 are arbitrary values, but these values can be determined, for example, on the basis of the hand velocity $V_r=\{(dx/dt)^2+(dy/dt)^2\}^{1/2}$ at which the robot arm 8 is operated. By determining values of $\alpha_1$, $\alpha_2$, $\beta_1$, and $\beta_2$ such that these values are increased in proportion to the hand velocity $V_r$, it is possible to increase the area of the impact-warning area 100 with increasing motion velocity of the robot arm 8, thereby improving the safety.

In the first embodiment, the values of $\alpha_1$, $\alpha_2$, $\beta_1$, and $\beta_2$ are set to $\alpha_1=1.2$ $V_K$, $\alpha_2=1.2$ $V_K$, $\beta_1=24$ $V_K$, and $\beta_2=24$ $V_K$, assuming that the unit of the hand velocity $V_r$ is m/s, and $V_K$ is a value proportional to the value of $V_r$ or a constant value, for example. In the case where there is the following equation (1), $V_K$ is a value (variable value) defined as $V_K=1.9V_r$. In the cases of $V_r<0.5$ [m/s], $V_K$ is a value (variable value) defined as a constant value $V_K=0.95$.

$$V_r \geq 0.5 \text{ [m/s]} \quad \text{[Equation 1]}$$

By setting as described above, in cases where the hand velocity is equal to or more than 0.5 [m/s], the size of the impact-warning area 100 is determined in proportion to the value of the hand velocity, while in cases where the hand velocity is less than 0.5 [m/s], the values of $\alpha_1$, $\alpha_2$, $\beta_1$, and $\beta_2$ are fixed values of $\alpha_1=1.14$, $\alpha_2=1.14$, $\beta_1=22.8$, and $\beta_2=22.8$. Accordingly, it is possible to ensure an impact-warning area 100 having a certain degree of size, even when the hand velocity is small.

The human approach detection means 3 calculates the relative relationship between the person 38 and the robot arm 8, from the information about the position of the person 38 detected by the human movement detection means 2 and joint angle information about the robot arm 8 obtained from the motion control means 7. If the person 38 enters the impact-warning area 100, the human approach detection means 3 notifies the impact countermeasure motion control means 4 of the intrusion of the person.

The impact position estimation means 5 estimates the following expected impact position $X_p$ at which the robot arm 8 is expected to impinge against the person 38, from the information about the position of the person 38 detected by the human movement detection means 2 and the information about the movement velocity vector.

$$X_p(x_i, y_i) \quad \text{[Equation 2]}$$

Then, the impact position estimation means 5 outputs the estimated expected impact position $X_p$ to the impact countermeasure motion creating means 6.

Figure 3B:
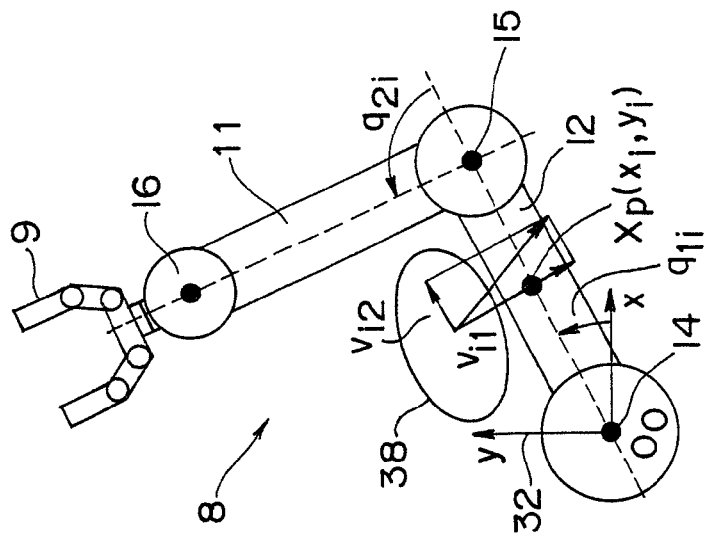
FIG. 3B is a plan view explaining the functions of the human movement detection means and the impact position estimation means in the control device according to the first embodiment.
Figure 3A:
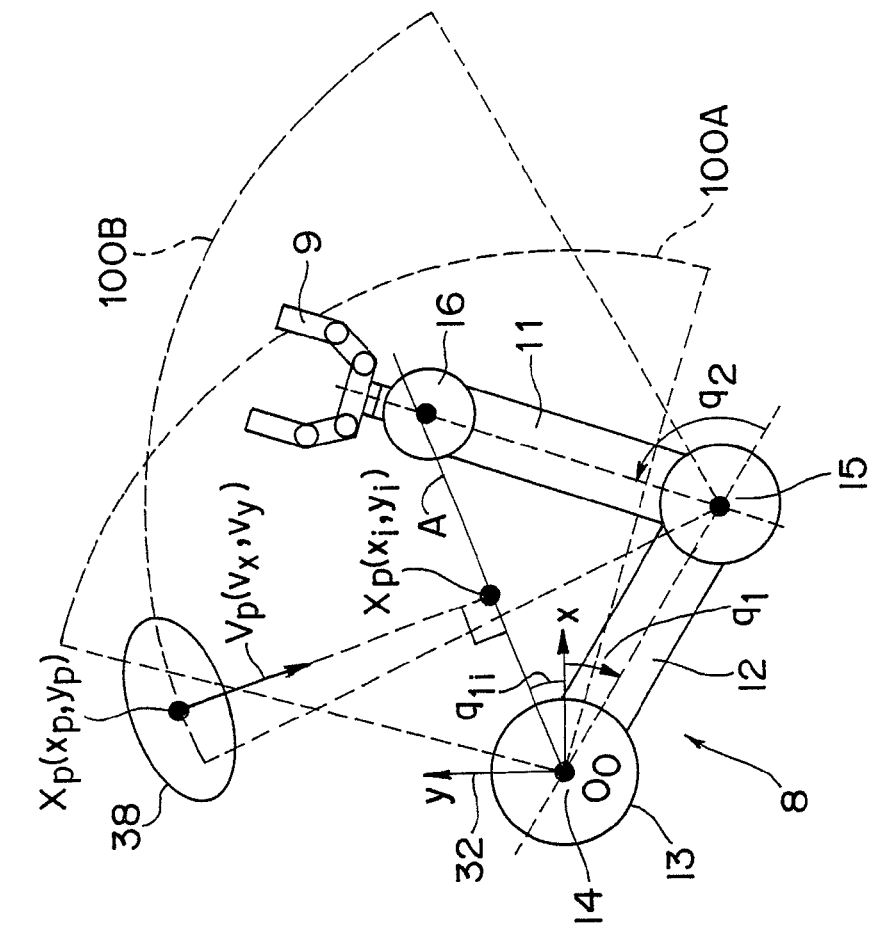
FIG. 3A is a plan view explaining the functions of a human movement detection means and an impact position estimation means in the control device according to the first embodiment.

For example, as illustrated in FIG. 3A, considerations will be made for the straight line A which orthogonally intersects with the extended line of the velocity vector $V_p$ ($v_x$, $v_y$) and also passes through the rotational axis of the first joint portion 14 of the robot arm 8. Assuming that the straight line A and the x axis of the absolute coordinate system 32 form an angle of $q_{1i}$ therebetween, and the intersection between the extended line of the velocity vector $V_p$ ($v_x$, $v_y$) and the straight line A is the expected impact position $X_p$, $$X_p(x_i, y_i), \quad \text{[Equation 3]}$$

the angle $q_{1i}$ is expressed as the following equation. Further, $X_p$, $$X_p(x_i, y_i) \quad \text{[Equation 4]}$$

is obtained from the following equations (1) to (3).

[Equation 5]
$$q_{li} = \pi/2 + \mathrm{atan2}(v_x, v_y) \quad \text{equation (1)}$$

[Equation 6]
$$x_i = \frac{(\pi/2 - q_{li})x_p + y_p}{\tan q_{li} - q_{li} + \pi/2} \quad \text{equation (2)}$$

[Equation 7]
$$y_i = x_i \tan q_{li} \quad \text{equation (3)}$$

Next, with reference to FIGS. 3A to 3C, the impact countermeasure motion creating means 6 will be described in detail.

The impact countermeasure motion creating means 6 creates a joint desired trajectory from the state (the current state) during normal motions of FIG. 3A to an impact accepting orientation of FIG. 3B.

The impact countermeasure motion creating means 6 determines the angle $q_{1i}$ of the first joint portion 14, such that the line along the center axis of the first link 12 of the robot arm 8 is coincident with the estimated impact position $X_p$, $$X_p(x_i, y_i) \quad \text{[Equation 8]}$$

Namely, the equation of $q_{1i}=\mathrm{atan}\,2(y_i, x_i)$ holds. In this case, the equation of $\mathrm{atan}\,2(y_i, x_i)=\arg(y_i+jx_i)$ holds, wherein "j" is the imaginary number, and "arg" is the argument of the complex number. Further, the angle $q_{2i}$ of the second joint portion 15 is set to a fixed value of, for example, 60°, in order to cause the robot arm 8 to surround the person 38.

The angle of the first joint portion 14 of the robot arm 8 when it takes the impact countermeasure orientation is set to $q_{1i}$. On the other hand, the angle $q_{2i}$ of the second joint portion 15 is changed in three contact patterns (1) to (3) as follows, according to the distance $L_{xi}$ between the expected impact position $X_p$, $$X_p(x_i, y_i) \quad \text{[Equation 9]}$$

and the origin point $O_0$ of the absolute coordinate system 3.

A contact pattern (1) illustrated in FIG. 3B:
In the case where the following relationship holds, $q_{2i}$ is set to 90°.

[Equation 10]
$$L_{xi} \leq L_1 \times 0.8 \quad \text{equation (3A)}$$

Figure 3C:
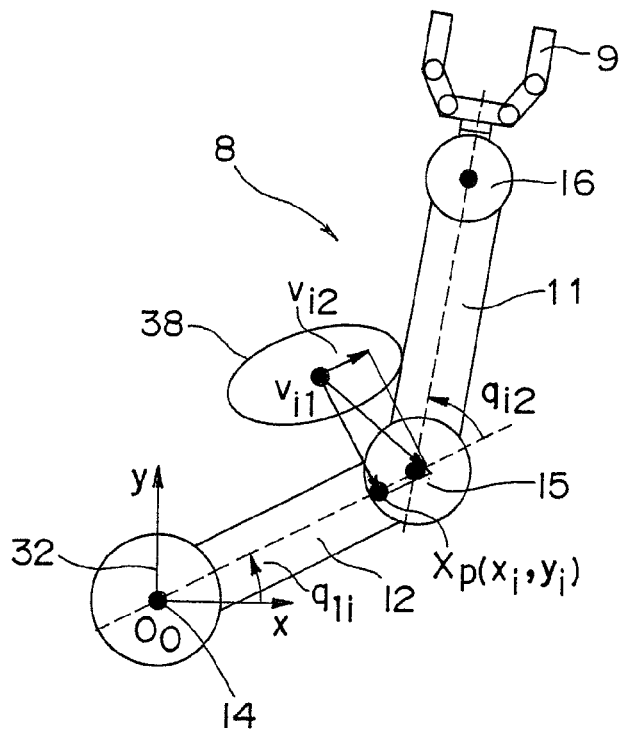
FIG. 3C is a plan view explaining the functions of the human movement detection means and the impact position estimation means in the control device according to the first embodiment.

A contact pattern (2) illustrated in FIG. 3C:
In the case where the following relationship holds, $q_{2i}$ is set to $q_{2i}=\{(L_{xi}-L_1)/0.4*L_1\}*90°$.

[Equation 11]
$$L_1 \times 0.8 < L_{xi} \leq L_1 \times 1.2 \quad \text{equation (3B)}$$

Figure 3D:
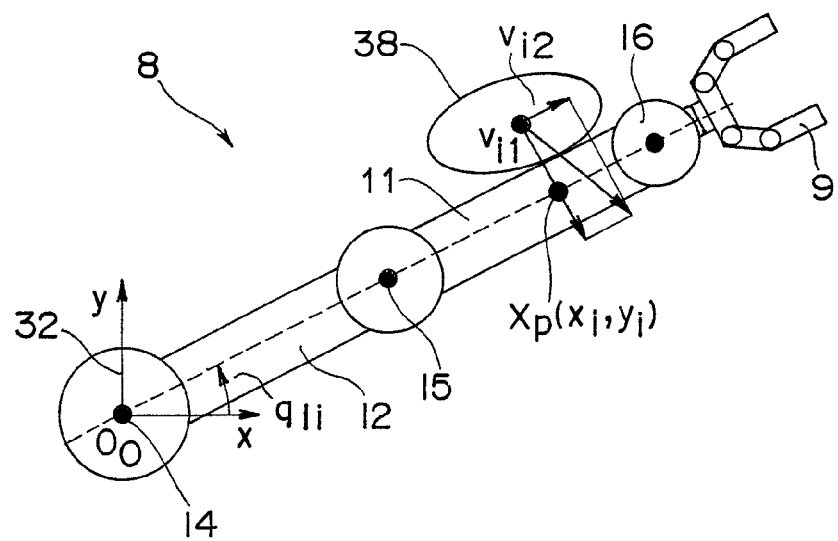
FIG. 3D is a plan view explaining the functions of the human movement detection means and the impact position estimation means in the control device according to the first embodiment.

A contact pattern (3) illustrated in FIG. 3D:
In the case of $L_1*1.2 < L_{xi}$, $q_{2i}$ is set to 0°.

By setting as described above, it is possible for the robot arm 8 to perform such impedance control motions involving orientations as follows.

In the case of the contact pattern (1), as illustrated in FIG. 3B, the robot arm 8 comes into contact with the person 38 at the first link 12, while the second link 11 takes an orientation which is folded with respect to the first link 12 by an angle of 90°, thereby causing the robot arm 8 to take an orientation surrounding the person 38.

In the case of the contact pattern (2), as illustrated in FIG. 3C, the robot arm 8 comes into contact with the person 38 around the second joint portion 15, and the robot arm 8 takes an orientation which varies the opening angle $q_{2i}$ of the second joint portion 15 according to the position on the robot arm 8 with which the person 38 comes into contact.

In the case of the contact pattern (3), as illustrated in FIG. 3D, the robot arm 8 comes into contact with the person 38 at the second link 11, and the angle $q_{2i}$ of the second joint portion 15 is 0°, so that the robot arm 8 takes such an orientation that the first link 12 and the second link 11 exist along a single straight line.

In the aforementioned impedance control motions, the impact countermeasure motion creating means 6 determines, through calculations, a joint angle desired value $q_{nd}(t)$ which is a desired trajectory from the current joint angle values ($q_1$, $q_2$) of the robot arm 8 to joint angles ($q_{1i}$, $q_{2i}$) at the time of contact motion, using the following quintic polynomial interpolation. In this case, "t" is time.

[Equation 12]
$$q_{nd}(t)=a_0+a_1 t+a_2 t^2+a_3 t^3+a_4 t^4+a_5 t^5 \quad \text{equation (4)}$$

In this case, the following equations hold.

[Equation 13]
$$a_0 = q_n \quad \text{equation (5)}$$

[Equation 14]
$$a_1 = \dot{q}_n \quad \text{equation (6)}$$

[Equation 15]
$$a_2 = \frac{1}{2}\ddot{q}_n \quad \text{equation (7)}$$

[Equation 16]
$$a_3 = \frac{1}{2 t_f^3}(20 q_{ni} - 20 q_n - 12\dot{q}_0 t_f - 3\ddot{q}_n t_f^2) \quad \text{equation (8)}$$

[Equation 17]
$$a_4 = \frac{1}{2 t_f^4}(30 q_n + 16\dot{q}_n t_f + 3\ddot{q}_n t_f^2) \quad \text{equation (9)}$$

[Equation 18]

$$a_5 = \frac{1}{2t_f^5}(-12q_n - 6\dot{q}_n t_f - \ddot{q}_n t_f^2)$$ equation (10)

[Equation 19]

$$n=1,2$$ equation (11)

Further, "$t_f$" is the time when the impedance control motion is completed.

The impact countermeasure motion creating means 6 outputs, to the motion control means 7, the joint angle desired value $q_{nd}(t)$ calculated according to the equation (4), as a joint angle desired value.

Further, the impact countermeasure motion creating means 6 determines the mechanical impedance values of the respective joint portions at the impact countermeasure orientations of FIGS. 3B to 3D, according to the contact patterns (1) to (3) and velocity components of the person 38 at the time of the occurrence of impact. There are the inertia I, the viscosity D, and the stiffness K, as setting parameters of the mechanical impedance values.

In the case of the contact patterns (1) and (2): the mechanical impedance parameters for the respective joint portions are determined by equations of $I_n = K_I / v_{in}$, $D_n = K_D / V_{in}$, $K_n = K_K / V_{in}$, according to the components $V_{i1}$ and $V_{i2}$ of the velocity of the person 38 which are perpendicular to the first and second links 12 and 11, respectively, at the time of the occurrence of contact. In this case, n is 1, 2. Further, $K_I$, $K_D$, and $K_K$ are constant gains, and the concrete numerical values thereof are experimentally determined in such a way as to realize safe motions. Further, the upper limit values $Imax_n$, $Dmax_n$, and $Kmax_n$ of the respective parameters are determined and, if the calculated values exceed these upper limit values, it is assumed that the respective parameters are equal to the upper limit values.

In the case of the contact pattern (3), the values of $I_1$, $D_1$, and $K_1$ are set to $I_1 = Imax_1$, $D_1 = Dmax_1$, and $K_1 = Kmax_1$ for the first joint portion 14, while, for the second joint portion 15, the mechanical impedance parameters for the second joint portion 15 are determined, according to equations of $I_2 = K_I / v_{i2}$, $D_2 = K_D / V_{i2}$, and $K_2 = K_K / V_{i2}$, according to the component $v_{i2}$ of the velocity of the person 38 perpendicular to the second link 11 at the time of the occurrence of contact.

The mechanical impedances of the wrist portion 10 are always kept at the upper limit values $I_n = Imax_n$, $D_n = Dmax_n$, and $K_n = Kmax_n$, wherein n is 3, 4.

The upper limit values are set to sufficiently-large values, such as $Imax_n = Dmax_n = Kmax_n = 10000$, wherein n is 1, 2, 3, 4.

By determining the mechanical impedances of the joint portions as described above, in cases where the person 38 impinges against the first link 12 substantially perpendicularly thereto, in the contact patterns (1) and (2), for example, $v_{i2}$ nearly equals to 0, and, accordingly, the values of the mechanical impedances of the first joint portion 14 are set to be smaller than those before the impedance control motions, thereby increasing the flexibility of the first joint portion 14, while the values of the mechanical impedances of the second joint portion 15, the third joint portion 16, and the fourth joint portion 17 are increased from those before the impedance control motions and set to the upper limit values, thereby increasing the stiffnesses of the second joint portion 15, the third joint portion 16, and the fourth joint portion 17. Namely, it is possible to perform, with the impact countermeasure motion control means 4, an impact countermeasure motion for making the stiffness of the first joint potion 14 closer to the base portion (the stand portion 13) than the first link 12, to which the impact position belongs, to be smaller than the stiffnesses of the other joint portions such as the second joint portion 15, the third joint portion 16, and the fourth joint portion 17. Accordingly, the flexibility of the first joint portion 14 alleviates the impact of the impact, while the stiffness of the second joint portion 15 prevents the second link 11 from being accidentally moved in reaction to the impact and then impacting the person 38, thereby ensuring safety. Further, the first link 12 and the second link 11 are caused to form an L shape surrounding the person 38 and, accordingly, the first link 12 and the second link 11 can function as a support in two directions, in front of the person 38 and at the side of the person 38, which prevents the person 38 from toppling (if the person 38 starts toppling, the person 38 can hold the first link 12 or the second link 11, which prevents the person 38 from toppling), thereby further improving the safety.

Further, even in cases where there is a velocity component $v_{i2}$ perpendicular to the second link 11, in the contact pattern (2), the stiffness of the second joint portion 15 is set to be smaller according to the velocity component $v_{i2}$, which increases the flexibility of the second joint portion 15, thereby ensuring safety.

Further, in the contact pattern (3), the stiffness of the first joint portion 14 is set to be larger than that before the impedance control motion, while the flexibility of the second joint portion 15, which is the joint portion at the side of the second link 11 which is closest to the base portion (the stand portion 13) with respect to the expected impact position belonging to the second link 11, is set to be smaller than that before the impedance control motion, according to the component $v_{i2}$ of the movement velocity of the person 38 perpendicular to the second link 11. This causes the flexibility of the second joint portion 15 to absorb the impact of the impact of the person 38 against the second link 11, thereby ensuring safety. Further, in comparison with the case of increasing the flexibility of the first joint portion 14 while setting the stiffness of the second joint portion 15 higher on the contrary to the aforementioned case, the inertia acting on the robot arm 8 at the time of the occurrence of impact is mainly constituted by the inertia of the second link 11 while the inertia of the first link 12 is not applied thereto, which can reduce the impact of the impact.

Further, in the case of the contact pattern (3), it is also possible to employ a method for making the flexibilities of both the first joint portion 14 and the second joint portion 15 to be higher than those of the third joint portion 16 and the fourth joint portion 17, namely making the flexibilities of all the joint portions closer to the base portion (the stand portion 13) than the second link 11, to which the expected impact position belongs, to be higher than the flexibilities of the other joint portions, as well as the case of setting the flexibility of the first joint portion 14 to be higher while setting the stiffness of the second joint portion 15 to be higher.

With this method, it is possible to ensure higher safety, in cases where there are ranges in which the joint portions can be moved. In cases where there are ranges in which the respective joint portions can be moved, if the joint portions are operated beyond the movable ranges due to an impact, the joint portions are prevented from being further moved, which prevents the joint portions to exert their flexibility. However, by making all the joint portions closer to the base portion (the stand portion 13) to be more flexible than the other joint portions, it is possible to sum the movable ranges of the first joint portion 14 and the second joint portion 15 to provide a larger movable range, which increases the range in which they can exert their flexibility, thereby improving the safety.

Next, with reference to FIG. 4, the motion control means 7 will be described in detail.

Figure 4:
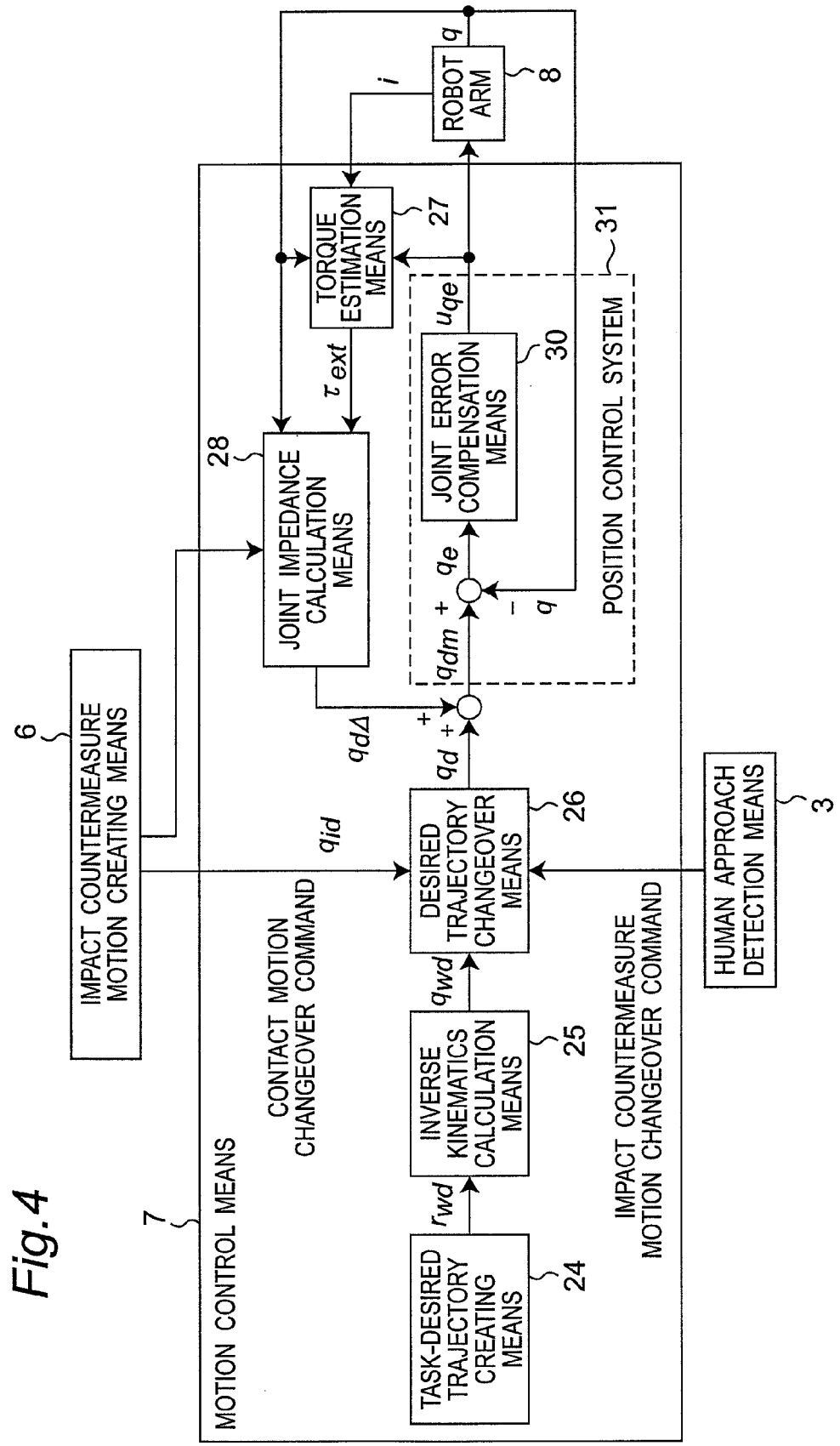
FIG. 4 is a block diagram illustrating the detailed structure of a motion control means in the control device according to the first embodiment.

In FIG. 4, 8 designates the robot arm illustrated in FIG. 1 which is an object to be controlled. The robot arm 8 outputs current joint angle values (a joint angle vector) $q=[q_1, q_2, q_3, q_4]^T$ measured by the encoders 35 on the respective joint portions, and the current joint angle values are introduced to the control device through the counter board 23. In this case, $q_1, q_2, q_3, q_4$ are the joint angles of the first joint portion 14, the second joint portion 15, the third joint portion 16, and the fourth joint portion 17.

Figure 7:
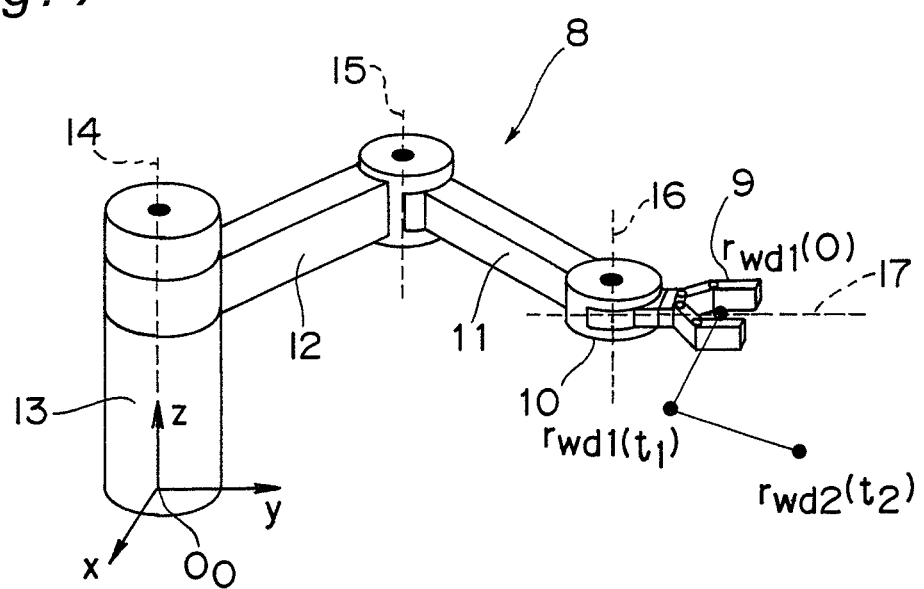
FIG. 7 is a view explaining a desired trajectory defined by the robot arm control device according to the first embodiment of the present invention.

24 designates a task-desired trajectory creating means which outputs a hand position/orientation desired vector $r_{wd}$ for realizing a desired task with the robot arm 8. As illustrated in FIG. 7, for an aimed motion of the robot arm 8, positions $(r_{wd0}, r_{wd1}, r_{wd2}, \ldots)$ are preliminarily given in association with respective teaching points, according to a desired task, and the desired trajectory creating means 24 interpolates the trajectory between adjacent positions associated with the points, using a polynomial interpolation, to create a hand position/orientation desired vector $r_{wd}$. In this case, it is assumed that the position $r_{wd0}$ is the position at time t=0, the position $r_{wd1}$ is the position at time t=$t_1$, and the position $r_{wd2}$ is the position at time t=$t_2$.

The desired trajectory creating means 24 inputs the hand position/orientation desired vector $r_{wd}$ to an inverse kinematics calculation means 25 which converts the hand position/orientation desired vector $r_{wd}$ into a joint desired vector $q_{wd}$.

26 designates a desired trajectory changeover means. The joint desired vector $q_{wd}$ from the inverse kinematics calculation means 25, an impact countermeasure motion joint desired vector $q_{id}$ from the impact countermeasure motion creating means 6, and an impact countermeasure motion changeover command from the human approach detection means 3 are inputted to the desired trajectory changeover means 26. Usually, the desired trajectory changeover means 26 selects the joint desired vector $q_{wd}$ that is converted by the inverse kinematics calculation means 25, of the hand position/orientation desired vector $r_{wd}$ created by the task-desired trajectory creating means 24, and then the desired trajectory changeover means 26 outputs the joint desired vector $q_{wd}$ as a joint desired vector $q_d$. However, when a person approaches, if the desired trajectory changeover means 26 receives an impact countermeasure motion changeover command from the human approach detection means 3, the desired trajectory changeover means 26 selects the contact motion joint desired vector $q_{id}$ inputted from the impact countermeasure motion creating means 6 and outputs the contact motion joint desired vector $q_{id}$ as a joint desired vector $q_d$.

27 designates a torque estimation means which estimates the external torques applied to the respective joint portions of the robot arm 8 due to the contact between the person 38 and the robot arm 8. The values of the electric currents $i=[i_1, i_2, i_3, i_4]^T$ flowing through the motors 34 for driving the respective joint portions of the robot arm 8, which are measured through current sensors in the motor driver 19, are introduced to the torque estimation means 27 through the A/D board 22. Further, the values q of the current joint angles and joint-angle error compensation outputs $u_{qe}$, which will be described later, are introduced to the torque estimation means 27 from a joint error compensation means 30. The torque estimation means 27 functions as an observer and calculates the torques $\tau_{ext} = [\tau_{1ext}, \tau_{2ext}, \tau_{3ext}, \tau_{4ext}]^T$ generating at the respective joint portions due to the external forces applied to the robot arm 8, from the electric current values i, the current joint angle values q, and the joint angle error compensation outputs $u_{qe}$.

A joint impedance calculation means 28 is a portion which has the function of realizing mechanical impedances of the robot arm 8. During normal motions during which no person 38 approaches, the joint impedance calculation means 28 outputs 0 to the input side of a position control system 31. On the other hand, if a person 38 approaches and the joint impedance calculation means 28 receives a contact motion changeover command from the impact countermeasure motion creating means 6, the joint impedance calculation means 28 calculates a joint desired correction output $q_{d\Delta}$ for realizing mechanical impedances of the respective joint portions of the robot arm 8 according to the following equation (12), from the mechanical impedance parameters I, D, and K determined by the impact countermeasure motion creating means 6, the current joint angle values q, and the external torques $\tau_{ext}$ estimated by the torque estimation means 7. Then, the joint impedance calculation means 28 outputs the joint desired correction output $q_{d\Delta}$ to the input side of the position control system 31. The joint desired correction output $q_{d\Delta}$ and the joint desired $q_d$ output from the desired trajectory changeover means 26 are summed at the input side of the position control system 31 to create a correction joint desired vector $q_{dm}$, and the correction joint desired vector $q_{dm}$ is inputted to the position control system 31.

[Equation 20]

$$q_{d\Delta} = (s^2 \hat{I} + s\hat{D} + \hat{K})^{-1} \tau_{ext} \qquad \text{equation (12)}$$

In this case, the following equations hold.

[Equation 21]

$$\hat{I} = \begin{bmatrix} I_1 & 0 & 0 & 0 \\ 0 & I_2 & 0 & 0 \\ 0 & 0 & I_3 & 0 \\ 0 & 0 & 0 & I_4 \end{bmatrix} \qquad \text{equation (13)}$$

[Equation 22]

$$\hat{D} = \begin{bmatrix} D_1 & 0 & 0 & 0 \\ 0 & D_2 & 0 & 0 \\ 0 & 0 & D_3 & 0 \\ 0 & 0 & 0 & D_4 \end{bmatrix}, \qquad \text{equation (14)}$$

[Equation 23]

$$\hat{K} = \begin{bmatrix} K_1 & 0 & 0 & 0 \\ 0 & K_2 & 0 & 0 \\ 0 & 0 & K_3 & 0 \\ 0 & 0 & 0 & K_4 \end{bmatrix} \qquad \text{equation (15)}$$

In the equations, s is a Laplace operator.

30 designates a joint error compensation means within the position control system 31. The error $q_e$ which is the difference between the current value q of the joint angle vector measured in the robot arm 8 and the joint correction desired vector $q_{dm}$ is inputted to the joint error compensation means 30, and the joint error compensation means 30 outputs a joint error compensation output $u_{qe}$ to the robot arm 8.

The joint error compensation output $u_{qe}$ is supplied, as a voltage command value, to the motor driver 19 through the D/A board 21, and the respective joint shafts are driven to rotate in a normal direction or in the opposite direction, thereby performing motions of the robot arm 8.

Further, as described above, the motion control means 7 is constituted by the desired trajectory creating means 24, the inverse kinematics calculation means 25, the desired trajectory changeover means 26, the torque estimation means 27, the joint impedance calculation means 28, and the position control system 31.

There will be described the principle of motions of the motion control means 7 having the aforementioned structure.

The motions thereof are basically feedback control (position control) on the joint vector (the current values of the joint angles) q by the joint error compensation means 30, and the portion enclosed by a dotted line in FIG. 4 is the position control system 31. By employing, for example, a PID compensation device as the joint error compensation means 30, it is possible to perform control in such a way as to converge the joint error $q_e$ to 0, thereby realizing desired motions of the robot arm 8.

If the human approach detection means 3 detects a person 38 entering the impact-warning area 100, the joint impedance calculation means 28 adds a joint desired correction output $q_{d\Delta}$ to a joint desired $q_d$ output from the desired trajectory changeover means 26 at the input side of the position control system 31 described above, thereby correcting the desired values for the joint portions. Accordingly, with the aforementioned position control system 31, the desired values for the joint portions are slightly deviated from the original values, thus resulting in realization of mechanical impedances. The joint desired correction output $q_{d\Delta}$ is calculated by the joint impedance calculation means 28 according to the equation (12), thereby realizing mechanical impedances of the inertia I, the viscosity D, and the stiffness K.

Figure 5:
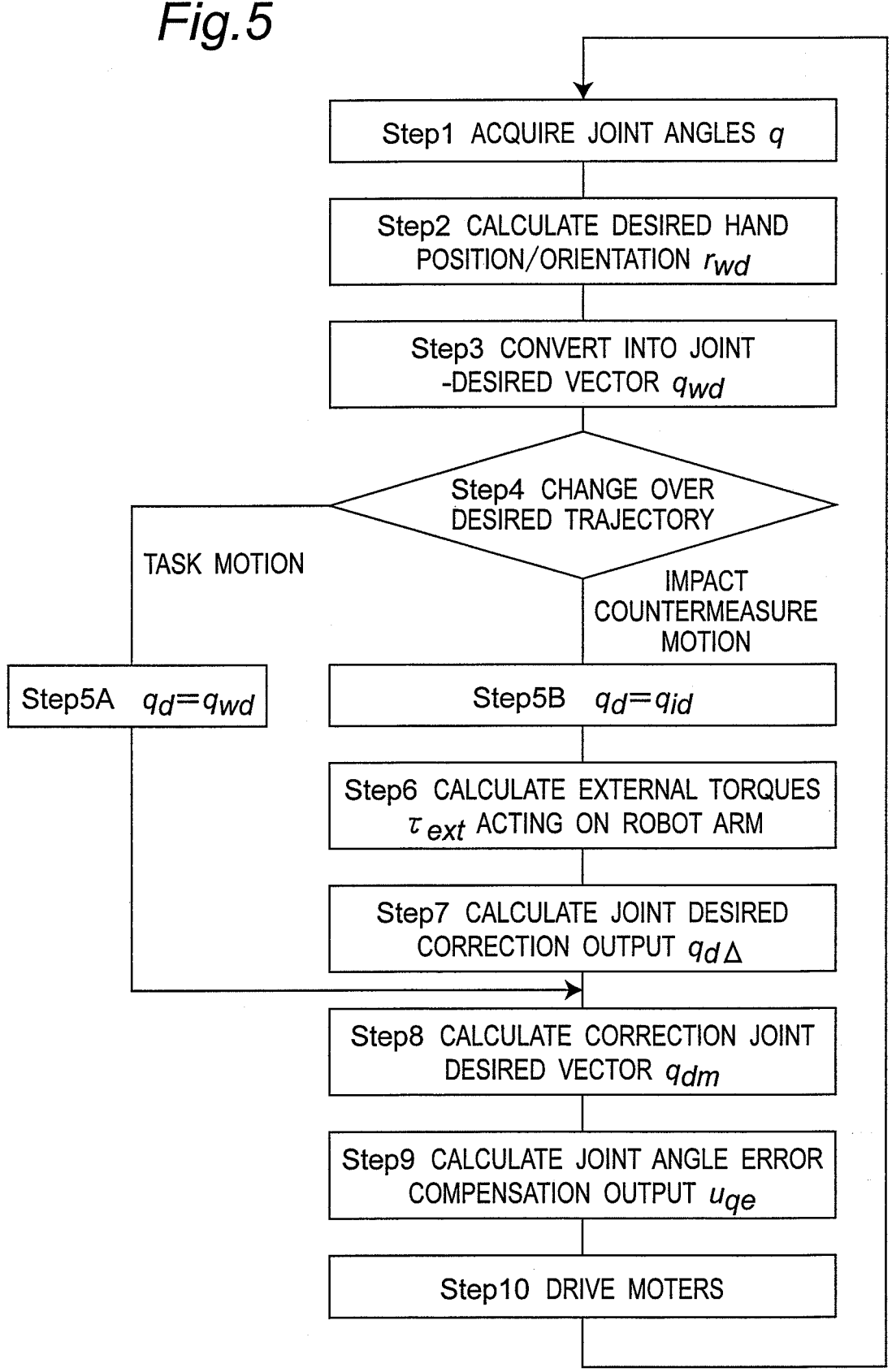
FIG. 5 is a flow chart illustrating motion steps in a control program executed by the motion control means in the control device according to the first embodiment.

There will be described actual motion steps in the control program for realizing the motions of the motion control means 7 based on the aforementioned principle, with reference to a flow chart of FIG. 5.

At a step 1, joint angle data (a joint variable value vector or a joint angle vector q) measured by the encoders 35 is introduced to the control device 1.

Next, at a step 2, on the basis of the programs 18 for controlling the motions of the robot arm 8 which are preliminarily stored in a memory (not illustrated) in the control device 1, the task-desired trajectory creating means 24 in the motion control means 7 calculates a hand position/orientation desired vector $r_{wd}$ of the robot arm 8.

Next, at a step 3, the inverse kinematics calculation means 25 converts the hand position/orientation desired vector $r_{wd}$ into a joint desired $q_{wd}$.

Next, at a step 4, the desired trajectory changeover means 26 change over the desired trajectory. If no person 38 enters the impact-warning area 100, the processing proceeds to a step 5A, in order to execute task motions. On the other hand, if a person 38 enters the impact-warning area 100, the processing proceeds to a step 5B, in order to execute an impact countermeasure motion (processing by the desired trajectory changeover means 26).

At the step 5B, a joint desired vector $q_d$ is set as a contact motion joint desired vector $q_{id}$ created by the impact countermeasure motion creating means 6 (processing by the desired trajectory changeover means 26). Thereafter, the processing proceeds to a step 6.

At the step 5A, a joint desired vector $q_d$ is set as the joint desired $q_{wd}$ (processing by the desired trajectory changeover means 26). Thereafter, the processing proceeds to a step 8.

At the step 6, the torque estimation means 27 estimates the external torques $\tau_{ext}$ on the joint portions of the robot arm 8, from the driving electric-current values i in the respective motors 34, the joint angle data (the joint angle vector (the current values of the joint angles) q), and the joint angle error compensation output $u_{qe}$ (processing by the torque estimation means 27).

Next, at a step 7, the joint impedance calculation means 28 calculates a joint desired correction output $q_{d\Delta}$, from the mechanical impedance parameters I, D, and K set by the impact countermeasure motion creating means 6, the joint angle data (the joint angle vector q), and the external torques $\tau_{ext}$ acting on the robot arm 8 and calculated by the torque estimation means 27 (processing by the joint impedance calculation means 28).

Next, at a step 8, a correction joint desired vector $q_{dm}$ which is the sum of the joint desired vector $q_d$ and the joint desired correction output $q_{d\Delta}$ is calculated and, the calculated correction joint desired vector $q_{dm}$ is inputted to the position control system 31.

Next, at a step 9, the error $q_e$ of the joint portions which is the difference between the correction joint desired vector $q_{dm}$ and the current joint vector q is inputted to the joint error compensation means 30, and the joint error compensation means 30 calculates a joint angle error compensation output $u_{qe}$ (processing by the joint error compensation means 30). It is possible to employ a PID compensation device, as a concrete example of the joint error compensation means 30. By properly adjusting three gains for proportion, differentiation, and integration which are diagonal matrixes of constant values, it is possible to perform control in such a way as to converge the joint error to 0.

Next, at a step 10, the joint angle error compensation output $u_{qe}$ is supplied through the D/A board 21 to the motor driver 19, so that the motor driver 19 changes the values of the electric currents flowing through the motors 34 for the respective joint portions, thereby generating rotational motions of the respective joint shafts in the robot arm 8.

The aforementioned steps 1 to 10 are repeatedly executed as a calculation loop for control, thereby realizing control of motions of the robot arm 8.

Figure 6:
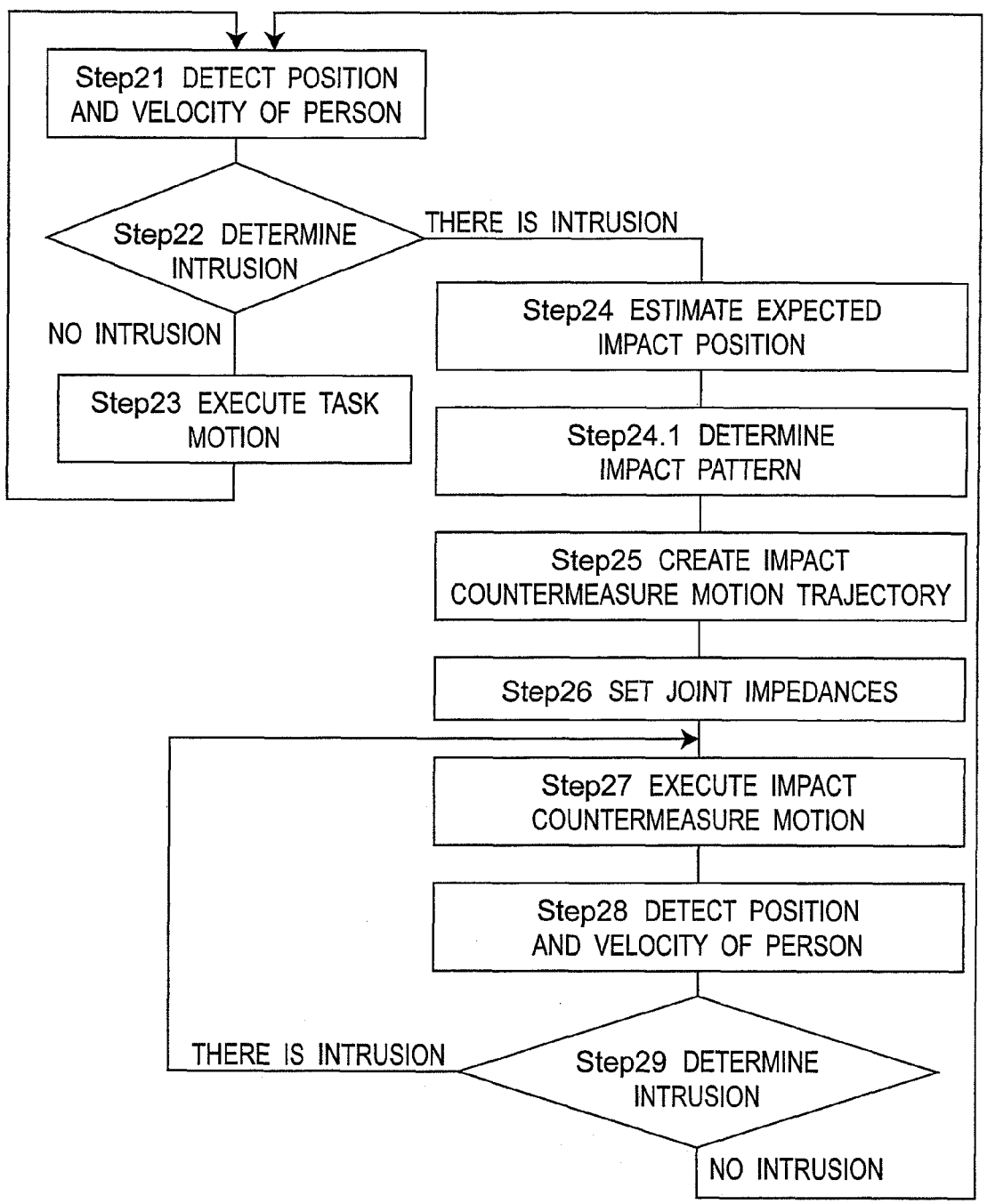
FIG. 6 is a flow chart illustrating entire motion steps executed by the control device according to the first embodiment.

Next, there will be described entire motions of the control device 1 according to the first embodiment of the present invention, by exemplifying motions for grasping and carrying an object with the hand 9 of the robot arm 8, on the basis of a flow chart of FIG. 6.

At a step 21, the human movement detection means 2 performs image recognition processing using image data from the image pickup device 36 to detect information about the position of a person 38 approaching the robot arm 8 and the velocity and direction of the movement of the person 38.

Next, at a step 22, the human approach detection means 3 determines whether or not the person 38 intrudes into the impact-warning area 100. Further, if the human approach detection means 3 determines that the person does not intrude, the processing proceeds to a step 23.

At the step 23, the motion control means 7 controls the motion of the robot arm 8 to perform task motions for grasping and carrying an object with the hand 9 of the robot arm 8.

After the step 23, the processing is returned to the step 21 and, unless the human approach detection means 3 detects intrusion of a person 38, the loop which starts with the step 21, then passes through the step 22 and the step 23 and then starts with the step 21 again is repeated to cause the robot arm 8 to perform normal motions for grasping and carrying the aforementioned object.

If intrusion of a person 38 is detected at the step 22, the processing proceeds to a step 24 where the impact position estimation means 5 estimates an expected impact position $X_p$, $$X_p(x_i, y_i)$$ [Equation 24]

Next, at a step 24.1, the impact countermeasure motion creating means 6 calculates the distance $L_{xi}$ between the expected impact position $X_p$ and the origin point $O_0$ of the absolute coordinate system 32 and then makes a comparison between the distance $L_{xi}$ and the length $L_1$. In the cases of the inequality of the equation (3A), in the case of the inequality of the equation (3B), or in the other cases, the impact countermeasure motion creating means 6 determine the occurrence of the contact pattern (1), the contact pattern (2), or the contact pattern (3), respectively.

Next, at a step 25, the impact countermeasure motion desired trajectory creating means 6 creates an impact countermeasure motion desired trajectory $q_d(t)$ for causing the robot arm 8 to take an impact countermeasure orientation at the expected impact position $X_p$, $$X_p(x_i, y_i) \quad \text{[Equation 25]}$$

according to the equation (4).

Next, at a step 26, the impact countermeasure motion desired trajectory creating means 6 sets the mechanical impedance values of the joint portions to be set at impact countermeasure orientations, according to the contact patterns (1) to (3), and according to the velocity of the movement of the approaching person 38, as previously described as a way of determining the mechanical impedances of the joint portions.

Next, at a step 27, the desired trajectory changeover means 26 in the motion control means 7 operates to select the impact countermeasure motion desired trajectory $q_d(t)$, and the position control system operates the robot arm 8 to take an impact countermeasure orientation. Further, the joint impedance calculation means 28 operates to control individually the mechanical impedance values of the respective joint portions of the robot arm 8 to be the mechanical impedance values which have been set.

Next, at a step 28, the human movement detection means 2 performs image recognition processing using image data from the image pickup device 36 to detect information about the position of a person 38 approaching the robot arm 8 and the velocity and direction of the movement of the person 38.

Next, at a step 29, the human approach detection means 3 determines whether or not the person 38 intrudes into the impact-warning area 100. Further, if the human approach detection means 3 determines that the person intrudes thereinto, the processing is returned to the step 27 and, unless it is determined that the person 38 does not exit the impact-warning area 100, the loop which starts with the step 27, then passes through the step 28 and the step 29 and then starts with the step 27 again is repeated to cause the robot arm 8 to continue the impact countermeasure motion.

On the other hand, if the human approach detection means 3 determines, at the step 29, that the person 38 does not intrude into the impact-warning area 100, the processing is returned to the step 21 and the robot arm 8 is restored to normal motions for grasping and carrying the aforementioned object.

Through the aforementioned motion steps 21 to 29, it is possible to realize motions for grasping and carrying the aforementioned object with the robot arm 8 and, if a person 38 approaches, it is possible to realize the changeover to impact countermeasure motions.

By providing the human movement detection means 2, the human approach detection means 3, the impact position estimation means 5, and the impact countermeasure motion control means 4, as described above, if a person 38 approaches the robot arm 8, it is possible to operate the robot arm 8 at an appropriate orientation according to the movement of a person 38 and, also, it is possible to control the impact countermeasure motions according to the impact between the person 38 and the robot arm 8 through proper mechanical impedances of the joint portions.

Since the robot arm 8 is secured to the floor surface at the stand portion 13 as the base portion, if there is not a joint portion which has lower stiffness and can be moved more easily than the other joint portions, out of the joint portions on the side closer to the base portion (the stand portion 13) than the expected impact position, this will induce a reactive force against the impact, thereby inducing an impact force. However, in the first embodiment of the present invention, when individual mechanical impedances are determined for the respective joint portions of the robot arm 8, a joint portion which has lower stiffness and can be moved more easily than the other joint portions is set, out of the joint portions on the side closer to the base (the stand portion 13), which can release the force acting on the robot arm due to the impact through this joint portion, thereby reducing the impact force applied to the person and improving the safety.

Therefore, with the control device 1 according to the first embodiment of the present invention, it is possible to realize control of safe motions of the robot arm 8 which is capable of causing even the multiple joint robot arm 8 to contact with a person safely, further capable of performing optimum contact motions according to the movement of a person and also is capable of causing the robot arm 8 to be coexistent with persons without damaging persons due to contact.

Further, while, in the first embodiment, the number of joint portions of the robot arm 8 is 3, but the number of joint portions is not limited thereto, and the same effects can be provided in cases where the robot arm 8 has two or more joint portions.

Further, while the first embodiment has been described by exemplifying a case where the robot arm 8 impinges against a person, the present invention is not limited thereto, and the same effects can be provided in cases where the robot arm 8 impinges against other moving objects such as a movable robot or a moving wagon.

Further, while, in the first embodiment, an expected impact position is estimated once if a person 38 enters the impact-warning area 100, the present invention is not limited thereto, and estimation of an expected impact position can be continuously performed. In this case, the accuracy of estimation of impact can be improved, which take countermeasures with more optimum orientations and contact patterns, thereby further improving the safety. On the other hand, in the case where estimation of an expected impact position is performed once as in the first embodiment, it is possible to reduce the amount of calculations, thereby offering the advantage of reduction of the load on the CPU.

Second Embodiment

Figure 8A:
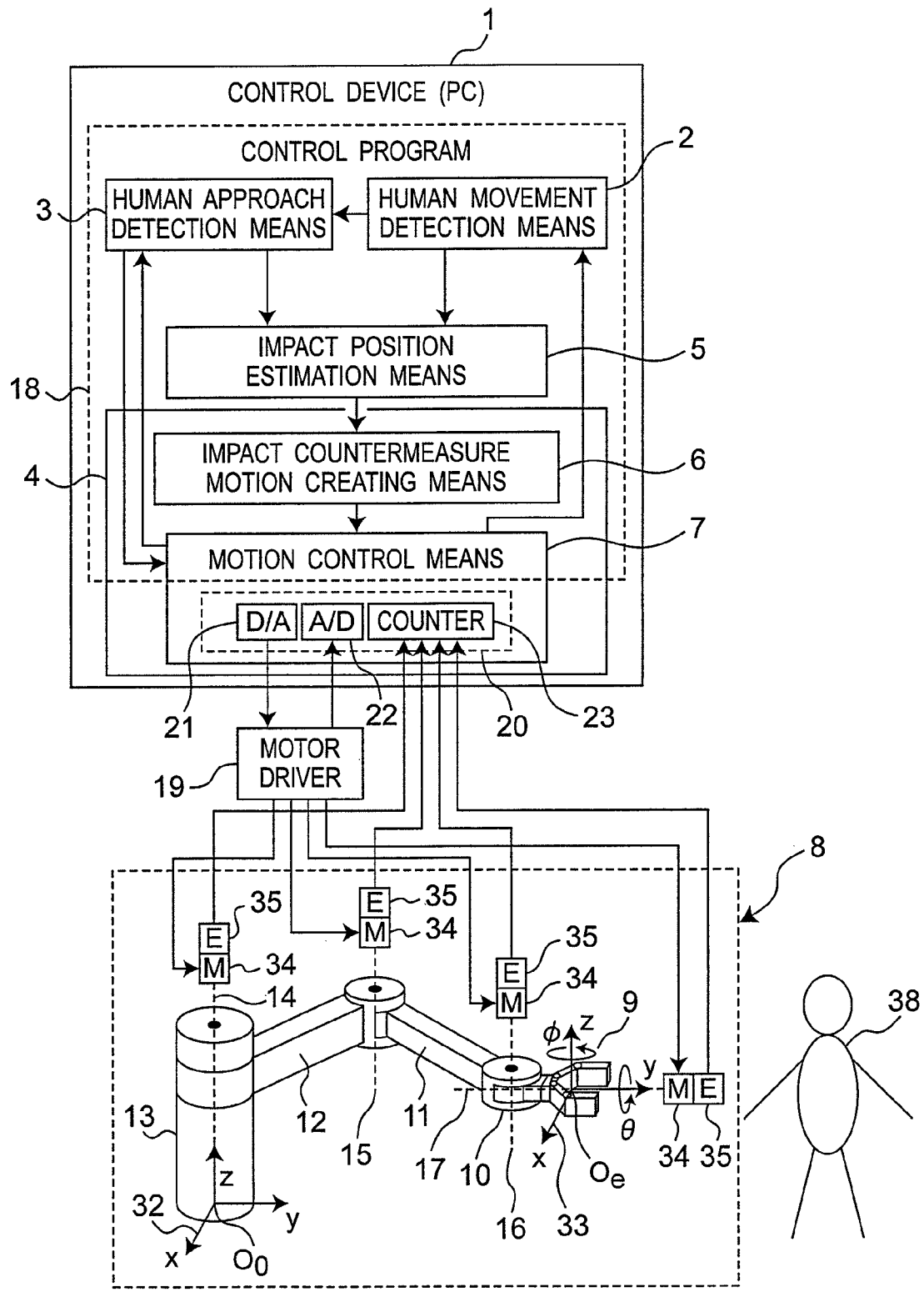
FIG. 8A is a view illustrating the structure of a robot arm control device and the structure of a robot arm to be controlled, according to a second embodiment of the present invention.
Figure 8B:
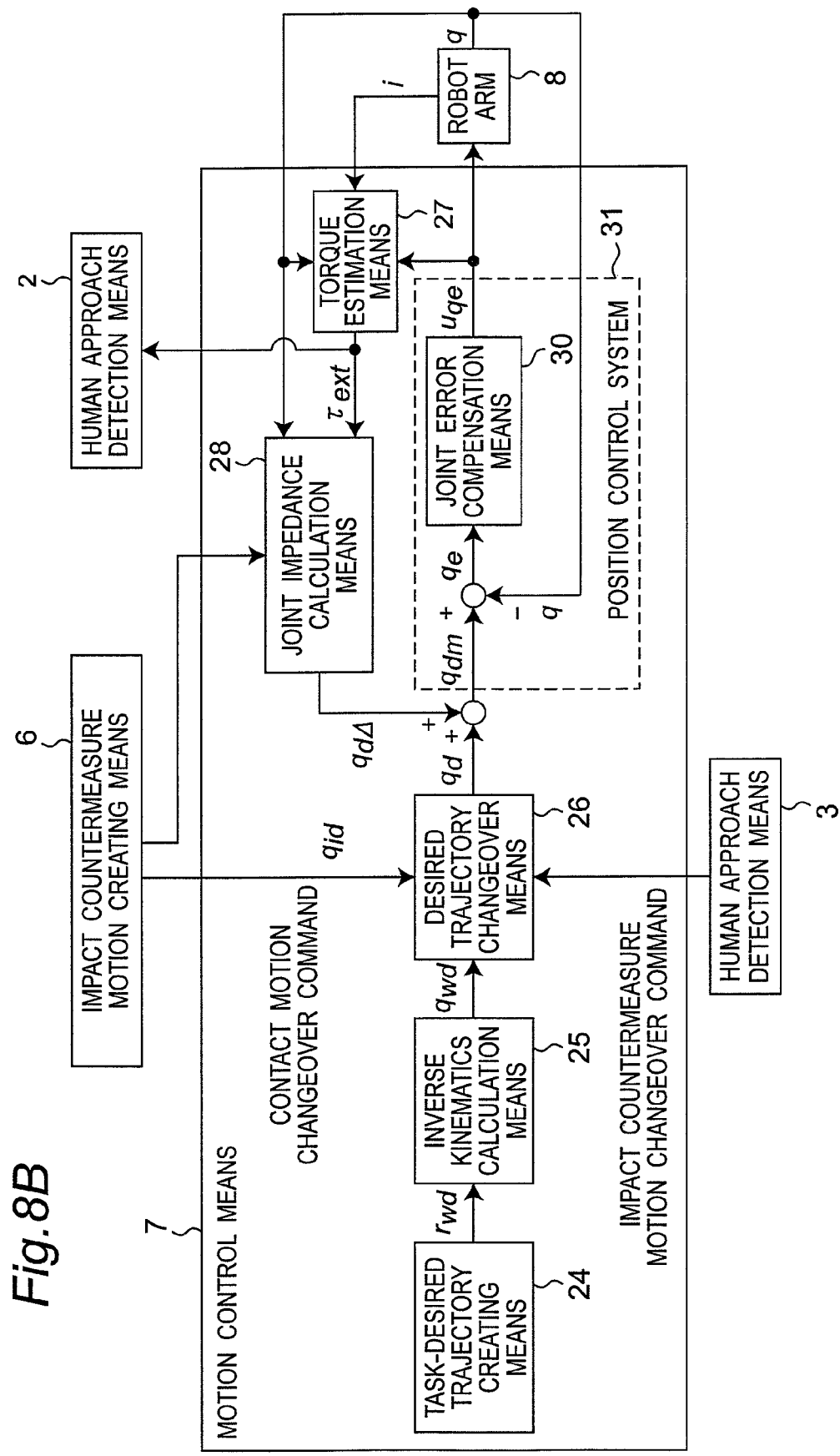
FIG. 8B is a block diagram illustrating the detailed structure of a motion control means in the control device according to the second embodiment.

FIGS. 8A and 8B are a view illustrating the structure of a control device 1 for a robot arm and the structure of the robot arm 8 to be controlled, according to a second embodiment of the present invention, and a block diagram illustrating the detailed structure of a motion control means for the control device, according to the second embodiment. The basic structure of the control device 1 according to the second embodiment of the present invention is the same as that according to the first embodiment illustrated in FIG. 1, and therefore the common portions thereof will not be described, and only different portions will be described later in detail.

In the second embodiment of the present invention, detection of human movement and detection of human approach are performed by detecting the force generated by the contact between the robot arm 8 and a person 38, not by performing image recognition processing. Accordingly, the human movement detection means 2 is structured such that information about external torques is inputted thereto from the torque estimation means 27 in the motion control means 7. Accordingly, the control device 1 according to the second embodiment is not required to include the image pickup device 36.

The human movement detection means 2 estimates the relative positional relationship between the robot arm 8 and the person 38, in the following patterns, on the basis of the external torques $\tau_{ext}=[\tau_{1ext}, \tau_{2ext}, \tau_{3ext}, \tau_{4ext}]^T$ estimated by the torque estimation means 27. In this case, torques which cause the joint portions to rotate in the counterclockwise direction in FIGS. 9A to 9D (when the robot arm 8 is viewed from above) will be defined as positive torques.

Figure 9A:
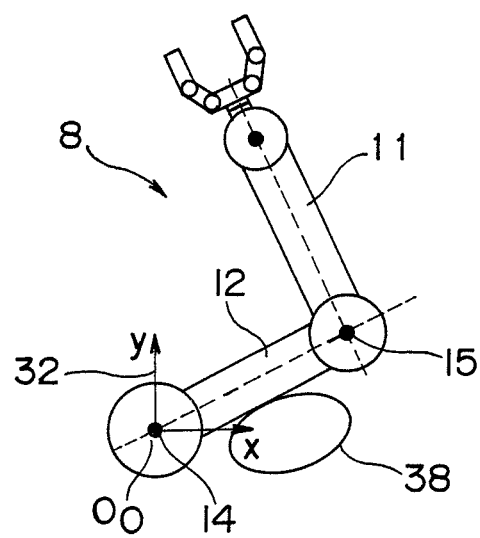
FIG. 9A is a view explaining motions of the robot arm control device according to the second embodiment of the present invention.

(1) In the case where the external torque $\tau_{1ext}$ acting on the first joint portion 14 is larger than 0 and, also, the external torque $\tau_{2ext}$ acting on the second joint portion 15 nearly equals to 0, the human movement detection means 2 estimates that the person 38 is contacting with the first link 12, as illustrated in FIG. 9A.

Figure 9B:
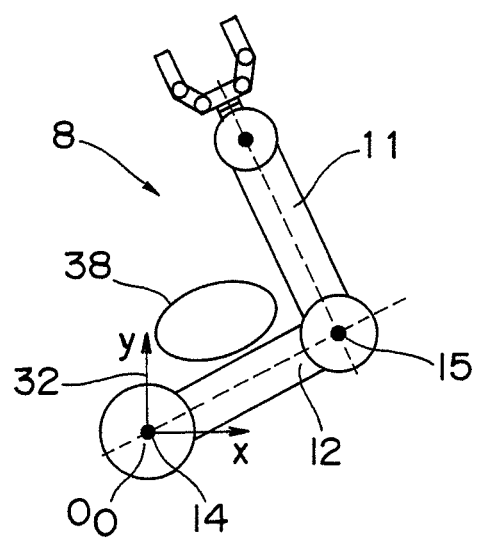
FIG. 9B is a view explaining motions of the robot arm control device according to the second embodiment of the present invention.

(2) In the case where the external torque $\tau_{1ext}$ acting on the first joint portion 14 is smaller than 0 and, also, the external torque $\tau_{2ext}$ acting on the second joint portion 15 nearly equals to 0, the human movement detection means 2 estimates that the person 38 is contacting with the first link 12, as illustrated in FIG. 9B.

Figure 9C:
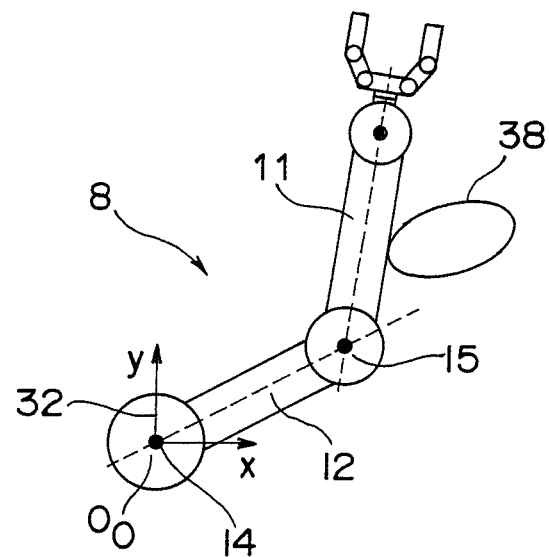
FIG. 9C is a view explaining motions of the robot arm control device according to the second embodiment of the present invention.

(3) In the case where the external torque $\tau_{1ext}$ acting on the first joint portion 14 is larger than 0 and, also, the external torque $\tau_{2ext}$ acting on the second joint portion 15 is larger than 0, the human movement detection means 2 estimates that the person 38 is contacting with the second link 11, as illustrated in FIG. 9C.

Figure 9D:
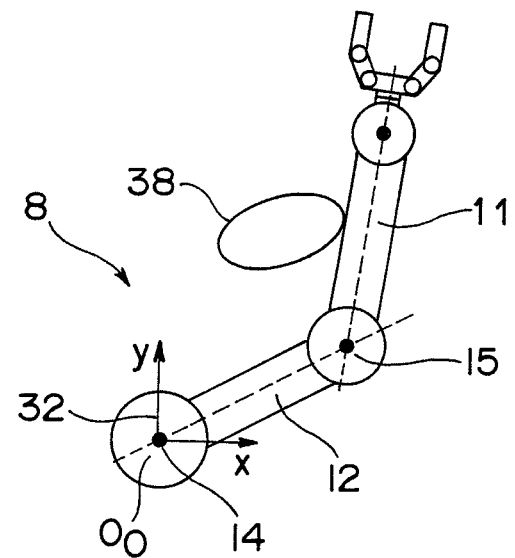
FIG. 9D is a view explaining motions of the robot arm control device according to the second embodiment of the present invention.

(4) In the case where the external torque $\tau_{1ext}$ acting on the first joint portion 14 is smaller than 0 and, also, the external torque $\tau_{2ext}$ acting on the second joint portion 15 is smaller than 0, the human movement detection means 2 estimates that the person 38 is contacting with the second link 11, as illustrated in FIG. 9D.

Through the assortment based on the aforementioned four patterns, it is possible to know the rough positional relationship between the robot arm 8 and the person 38. Further, the human approach detection means 3 detects the changes of the external torques from the state where the external torque $\tau_{1ext}$ acting on the first joint portion 14 nearly equals to 0 and the external torque $\tau_{2ext}$ acting on the second joint portion 15 nearly equals to 0 to any one of the aforementioned patterns (1) to (4), to detect approach of the person 38.

By estimating the rough position of the person 38 according to the aforementioned method, it is possible to control the orientation and the joint torques according to the positional relationship with the impact countermeasure motion control means 4, thereby enabling safely controlling the motions of the robot arm 8 which can be coexistent with a person 38.

Further, while, in the first embodiment, the human movement detection means 2 is realized by image recognition processing, the human movement detection means 2 is not limited thereto, and it is also possible to employ any other sensing means capable of detecting the position and the velocity of a person 38, such as a laser radar sensor or an ultrasonic wave sensor, thus offering the same effects.

Figure 10:
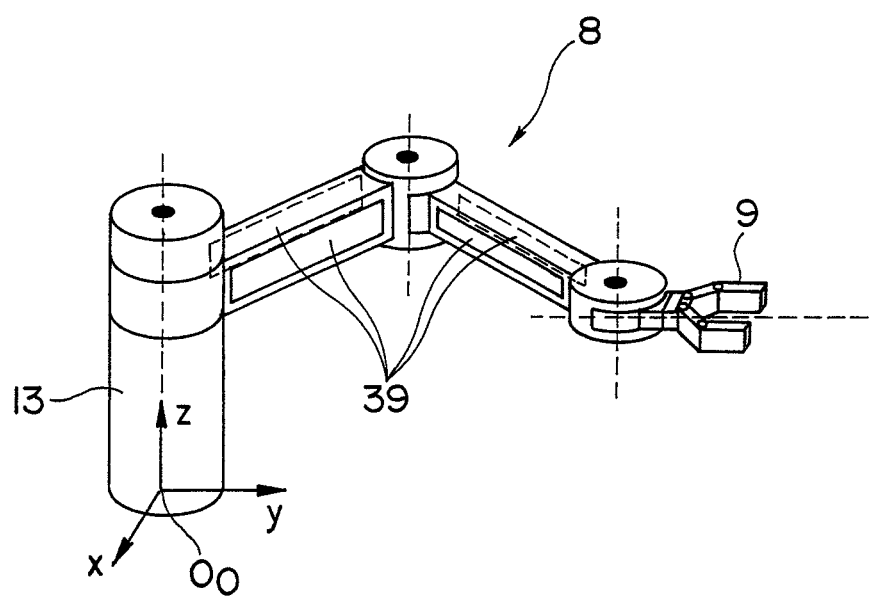
FIG. 10 is a view illustrating another structure of a robot arm to be controlled by the robot arm control device according to the second embodiment of the present invention.
Figure 11A:
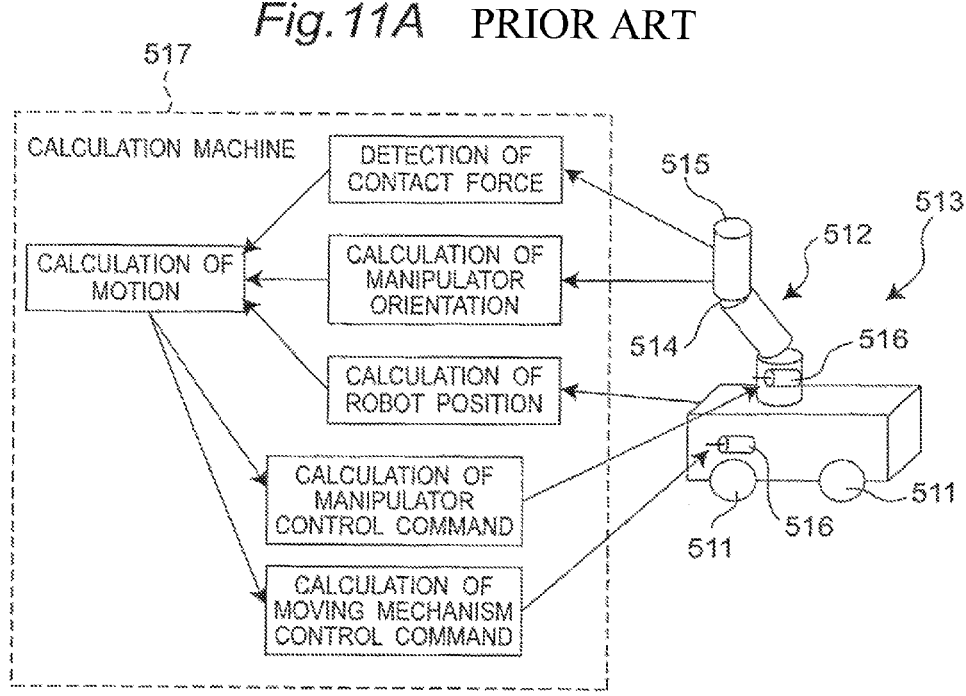
FIG. 11A is a schematic configuration view of a conventional robot control device in Patent Document 2.
Figure 11B:
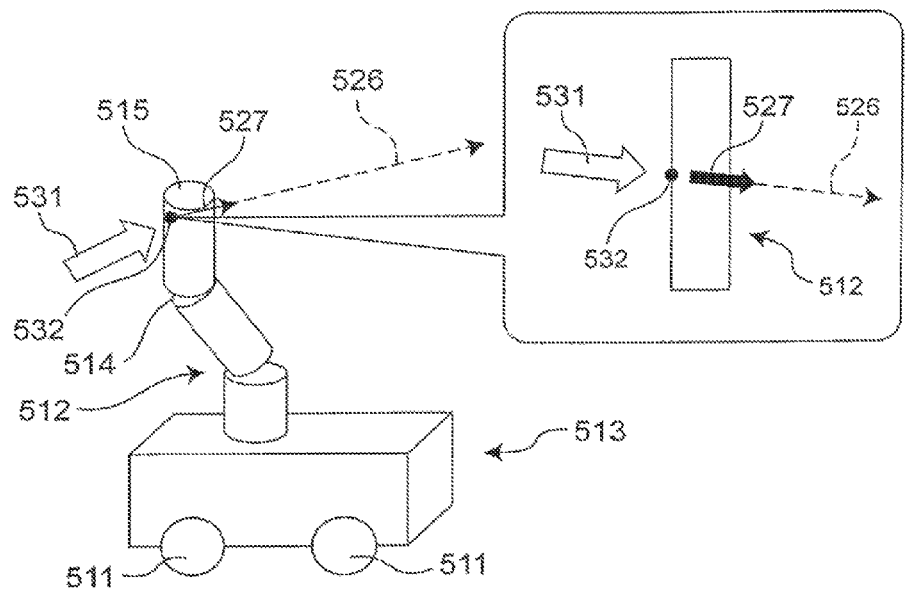
FIG. 11B is a view illustrating a concrete example of a contact avoiding motion of the robot control device of FIG. 11A.
Figure 11C:
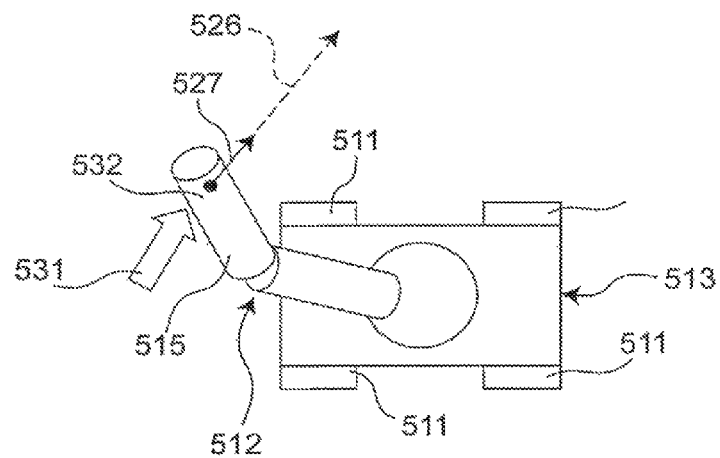
FIG. 11C is a view illustrating the concrete example of the contact avoiding motion of the robot control device of FIG. 11A.
Figure 11D:
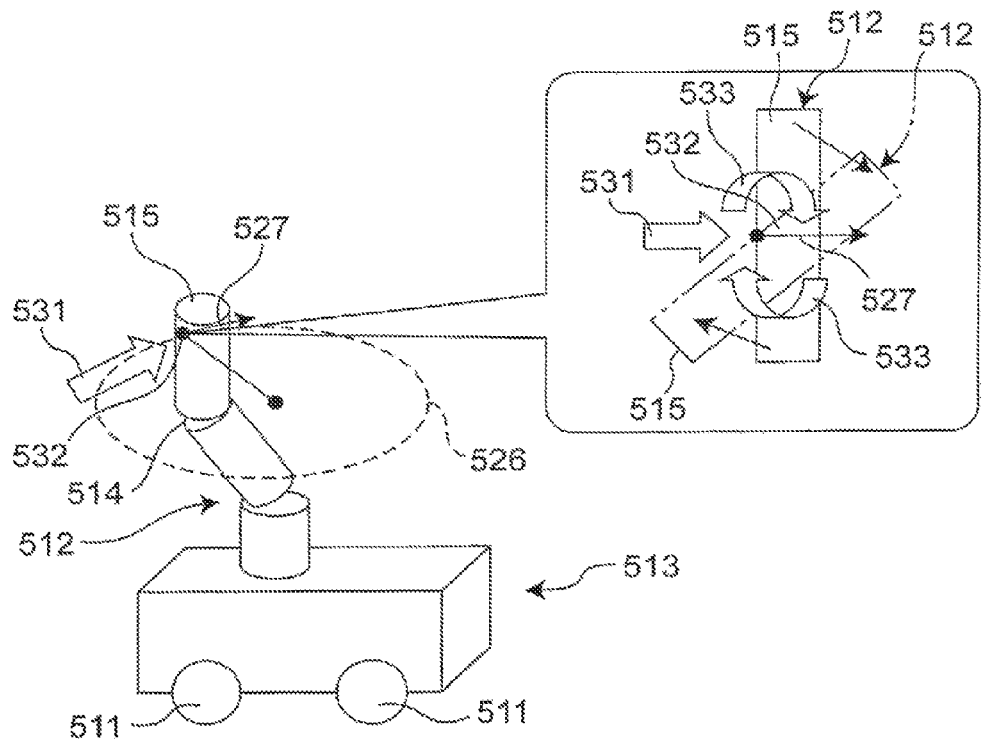
FIG. 11D is a view illustrating another concrete example of the contact avoiding motion of the robot control device of FIG. 11A.
Figure 11E:
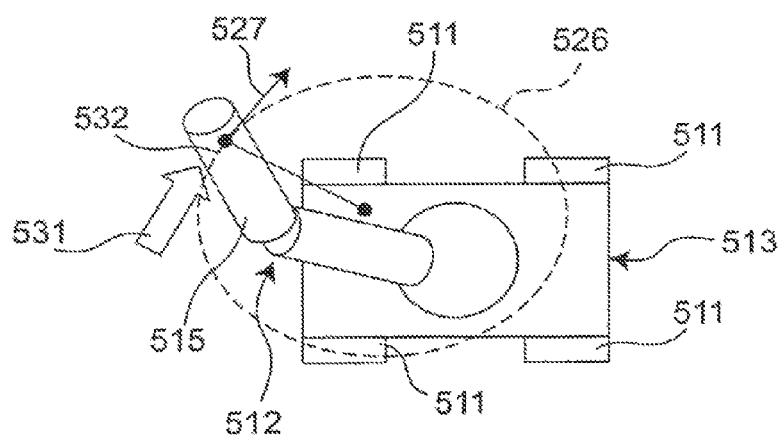
FIG. 11E is a view illustrating the aforementioned another concrete example of the contact avoiding motion of the robot control device of FIG. 11A.
Figure 12:
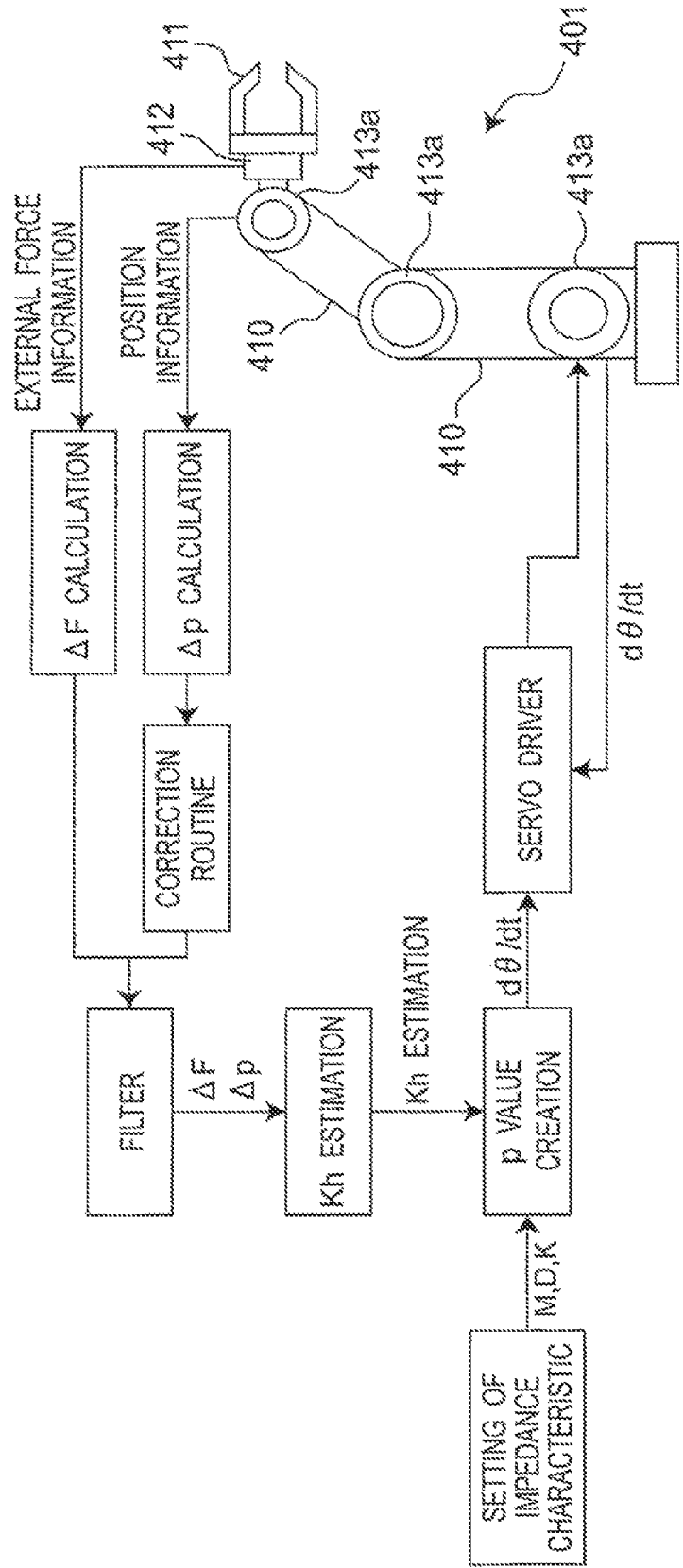
FIG. 12 is a block diagram of a conventional robot control device in Patent Document 3.

Further, while, in the second embodiment, the human detection is performed on the basis of external torques estimated by the torque estimation means 27, the present invention is not limited thereto and, as illustrated in FIG. 10, contact sensors 39 as an example of the impact position acquisition means can be provided at the portions which can come into contact with persons 38, such as the links 12 and 11 of the robot arm 8, so that persons 38 contacts with the contact sensors 39 to perform human detection, which also offers the same effects. Also, both contact sensors and human detection using external torques can be employed, which increases the estimation accuracy, thereby enabling controlling the robot arm 8 with higher safety.

Further, while, in the second embodiment, the number of joint portions of the robot arm 8 is 3, but the number of joint portions is not limited thereto, and the same effects can be provided in cases where the robot arm 8 has two or more joint portions.

Further, while the second embodiment has been described by exemplifying a case where the robot arm 8 impinges against a person, the present invention is not limited thereto, and the same effects can be provided in cases where the robot arm 8 impinges against other moving objects such as a movable robot or a moving wagon.

Further, while, in the first and second embodiments, the robot arm 8 has been exemplified, the present invention is not limited to a robot arm, but the present invention can be also applied to other movable objects such as a movable robot which moves through wheels, a biped robot and a multi-legged robot, as well as an arm, in cases where the main body comes into contact with persons, to offer the same effects as those of the present invention.

By properly combining the arbitrary embodiments of the aforementioned various embodiments, the effects possessed by the embodiments can be produced.

INDUSTRIAL APPLICABILITY

The robot arm control device and control method, the robot, and the robot arm control program according to the present invention are usable as a robot arm control device and control method, a robot, and a robot arm control program for controlling the motions of a robot arm which can come into contact with a person, such as a household robot. Further, the present invention can be used as a control device for an industrial robot or a movable mechanism for use in production equipment, as well as for a household robot.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A control device for controlling a multiple joint robot arm having at least two links, a first joint portion and a second joint portion, the control device comprising:
   an impact position acquisition means for acquiring an impact position at which the multiple joint robot arm comes into contact with a person or a movable object; and
   an impact countermeasure motion control means for controlling the multiple joint robot arm to perform an impact countermeasure motion, the impact countermeasure motion making a stiffness of one joint portion of the first joint portion and the second joint portion, which is closer to a base portion than a link, of the at least two links, to which the impact position belongs, lower than a stiffness of another joint portion of the first joint portion and the second joint portion, based on the acquired impact position at which the multiple joint robot arm comes into contact with the person or the movable object, wherein the impact countermeasure motion control means controls the multiple joint robot arm to perform the impact countermeasure motion by one of (i) maintaining a stiffness of the another joint portion of the first joint portion and the second joint portion, closer to a wrist portion than the link, of the at least two links, to which the impact position belongs, and (ii) providing additional stiffness to the another joint portion closer to the wrist portion than the link, of the at least two links, to which the impact position belongs, wherein the impact countermeasure motion control means comprises an impact countermeasure motion creating means and a motion control means, wherein the impact countermeasure motion creating means determines joint desired mechanical impedance values of the first and second joint portions, respectively, at impact countermeasure orientations, and wherein the motion control means performs an impedance control for controlling mechanical impedance values of the first and second joint portions, respectively, so as to realize the joint desired mechanical impedance values created by the impact countermeasure motion creating means.

2. A control device for controlling a multiple joint robot arm having at least two links, a first joint portion and a second joint portion, the control device comprising:

an impact position acquisition means for acquiring an impact position at which the multiple joint robot arm comes into contact with a person or a movable object; and an impact countermeasure motion control means for controlling the multiple joint robot arm to perform an impact countermeasure motion, the impact countermeasure motion making a stiffness of one joint portion of the first joint portion and the second joint portion, which is closer to a base portion than a link, of the at least two links, to which the impact position belongs, lower than a stiffness of another joint portion of the first joint portion and the second joint portion, based on the acquired impact position at which the multiple joint robot arm comes into contact with the person or the movable object, wherein the impact countermeasure motion control means controls the multiple joint robot arm to perform the impact countermeasure motion by one of (i) making the stiffness of the one joint portion of the first joint portion and the second joint portion, which is closer to the base portion than the link, of the at least two links, to which the impact position belongs, lower than the stiffness of the another joint portion of the first joint portion and the second joint portion, and maintaining the stiffness of the another joint portion of the first joint portion and the second joint portion, closer to a wrist portion than the link, of the at least two links, to which the impact position belongs, and (ii) providing additional stiffness to the another joint portion closer to the wrist portion than the link, of the at least two links, to which the impact position belongs, wherein the impact countermeasure motion control means comprises an impact countermeasure motion creating means and a motion control means, wherein the impact countermeasure motion creating means determines joint desired mechanical impedance values of the first and second joint portions, respectively, at impact countermeasure orientations, and wherein the motion control means performs an impedance control for controlling mechanical impedance values of the first and second joint portions, respectively, so as to realize the joint desired mechanical impedance values created by the impact countermeasure motion creating means.

3. The control device as claimed in claim 1, wherein parameters of the mechanical impedance values are an inertia, a viscosity, and a stiffness of the first joint portion and the second joint portion of the robot arm.

4. The control device as claimed in claim 2, wherein parameters of the mechanical impedance values are an inertia, a viscosity, and a stiffness of the first joint portion and the second joint portion of the robot arm.

* * * * *